United States Patent
Le et al.

(10) Patent No.: US 12,518,364 B2
(45) Date of Patent: Jan. 6, 2026

(54) MACHINE LEARNING SEGMENTATION-BASED TONE MAPPING IN HIGH NOISE AND HIGH DYNAMIC RANGE ENVIRONMENTS OR OTHER ENVIRONMENTS

(71) Applicant: Samsung Electronics Co., Ltd., Suwon-si (KR)

(72) Inventors: Nguyen Thang Long Le, Garland, TX (US); Tyler Luu, Richardson, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 18/454,247

(22) Filed: Aug. 23, 2023

(65) Prior Publication Data

US 2024/0257324 A1    Aug. 1, 2024

Related U.S. Application Data

(60) Provisional application No. 63/455,675, filed on Mar. 30, 2023, provisional application No. 63/441,306, filed on Jan. 26, 2023.

(51) Int. Cl.
*G06T 5/00* (2024.01)
*G06T 5/50* (2006.01)
(Continued)

(52) U.S. Cl.
CPC .................. *G06T 5/92* (2024.01); *G06T 5/50* (2013.01); *G06T 5/70* (2024.01);
(Continued)

(58) Field of Classification Search
CPC .... G06T 5/92; G06T 5/70; G06T 5/50; G06T 2207/20192; G06T 2207/20208; G06T 2207/20221
See application file for complete search history.

(56) References Cited

U.S. PATENT DOCUMENTS 9,531,962 B2    12/2016   Sezer et al.
10,805,649 B2   10/2020   Pekkucuksen et al.
(Continued)

FOREIGN PATENT DOCUMENTS

CN    114241216 A    3/2022
CN    115330633 A    11/2022
(Continued)

OTHER PUBLICATIONS

NPL: Results Publication Date Range: Jul. 22, 2010 to Jul. 9, 2025.*
(Continued)

*Primary Examiner* — Quang N Vo

(57) ABSTRACT

A method includes obtaining multiple input image frames and generating a high dynamic range (HDR) blended image based on the input image frames, where the HDR blended image has a higher dynamic range than individual ones of the input image frames. The method also includes performing a tone fusion operation on the HDR blended image based on a semantic delta-weight map to generate a fused image. Performing the tone fusion operation includes synthesizing multiple low dynamic range (LDR) images based on the HDR blended image and generating initial weight maps based on the LDR images. Performing the tone fusion operation also includes generating filtered weight maps based on the initial weight maps, the semantic delta-weight map, and a guided filter. Performing the tone fusion operation further includes generating the fused image based on the filtered weight maps and decomposed versions of the LDR images.

20 Claims, 10 Drawing Sheets

(51) Int. Cl.
    *G06T 5/70*     (2024.01)
    *G06T 5/92*     (2024.01)

(52) U.S. Cl.
    CPC ............... *G06T 2207/20192* (2013.01); *G06T 2207/20208* (2013.01); *G06T 2207/20221* (2013.01)

(56) References Cited

U.S. PATENT DOCUMENTS

| | | |
|---|---|---|
| 10,911,691 B1 | 2/2021 | Le et al. |
| 10,944,914 B1 | 3/2021 | Le et al. |
| 11,128,809 B2 | 9/2021 | Zhen et al. |
| 11,151,731 B2 | 10/2021 | Zhen et al. |
| 11,388,348 B2 | 7/2022 | Le et al. |
| 11,430,094 B2 | 8/2022 | Zhen et al. |
| 2012/0113130 A1 | 5/2012 | Zhai et al. |
| 2013/0229546 A1 | 9/2013 | Furumura et al. |
| 2014/0307960 A1* | 10/2014 | Sharma .................. H04N 23/80 382/162 |
| 2015/0043811 A1 | 2/2015 | Prabhudesai et al. |
| 2019/0096046 A1 | 3/2019 | Kalantari et al. |
| 2019/0236761 A1 | 8/2019 | Cauvin et al. |
| 2020/0134787 A1 | 4/2020 | Bouzaraa et al. |
| 2020/0265567 A1* | 8/2020 | Hu ............................ G06T 5/50 |
| 2020/0267300 A1 | 8/2020 | Zhen et al. |
| 2020/0329187 A1 | 10/2020 | Huang |
| 2022/0222854 A1 | 7/2022 | Le et al. |
| 2023/0034109 A1 | 2/2023 | Le et al. |
| 2023/0068238 A1 | 3/2023 | Li et al. |

FOREIGN PATENT DOCUMENTS

| | | |
|---|---|---|
| KR | 10-1717733 B1 | 3/2017 |
| KR | 10-2022-0028814 A | 3/2022 |
| WO | 2023086194 A1 | 5/2023 |

OTHER PUBLICATIONS

International Search Report and Written Opinion of the International Searching Authority dated Mar. 6, 2024 in connection with International Patent Application No. PCT/KR2023/019744, 6 pages.
Le et al., "System and Method for Scene-Adaptive Denoise Scheduling and Efficient Deghosting," U.S. Appl. No. 18/149,714, filed Jan. 4, 2023, 53 pages.
Wikipedia, "Adaptive histogram equalization," Oct. 2022, 8 pages.
He et al., "Guided Image Filtering," IEEE Transactions on Pattern Analysis and Machine Intelligence, vol. 35, Issue 6, Jun. 2013, 14 pages.
Supplementary European Search Report dated Dec. 1, 2025 in connection with European Patent Application No. 23918761.0, 6 pages.
Goswami et al., "Tone mapping Operators: Progressing towards semantic-awareness," IEEE International Conference on Multimedia Expo Workshops (ICMEW), IEEE, Jul. 2020, 6 pages.

\* cited by examiner

MACHINE LEARNING SEGMENTATION-BASED TONE MAPPING IN HIGH NOISE AND HIGH DYNAMIC RANGE ENVIRONMENTS OR OTHER ENVIRONMENTS

CROSS-REFERENCE TO RELATED APPLICATIONS AND PRIORITY CLAIM

This application claims priority under 35 U.S.C. § 119(e) to U.S. Provisional Patent Application No. 63/441,306 filed on Jan. 26, 2023 and U.S. Provisional Patent Application No. 63/455,675 filed on Mar. 30, 2023. Both of these provisional patent applications are hereby incorporated by reference in their entirety.

TECHNICAL FIELD

This disclosure relates generally to imaging systems. More specifically, this disclosure relates to machine learning segmentation-based tone mapping in high noise and high dynamic range environments or other environments.

BACKGROUND

Mobile electronic devices, such as smartphones and tablet computers, have become the most prevalent device type for capturing, uploading, and sharing digital images. "Computational photography" refers to an image generation technique commonly used in these and other types of devices in which one or more digital images of a scene are captured and processed digitally in order to produce desired effects within one or more final images of the scene. Computational photography has advanced in the past several years to significantly close the gap against traditional digital single lens reflex (DSLR) cameras. For example, computational photography techniques have been developed to effectively support functions such as zooming, low-light photography, and the use of under-display cameras.

SUMMARY

This disclosure relates to machine learning segmentation-based tone mapping in high noise and high dynamic range environments or other environments.

In a first embodiment, a method includes obtaining multiple input image frames and generating a high dynamic range (HDR) blended image based on the input image frames, where the HDR blended image has a higher dynamic range than individual ones of the input image frames. The method also includes performing a tone fusion operation on the HDR blended image based on a semantic delta-weight map to generate a fused image. Performing the tone fusion operation includes synthesizing multiple low dynamic range (LDR) images based on the HDR blended image and generating initial weight maps based on the LDR images. Performing the tone fusion operation also includes generating filtered weight maps based on the initial weight maps, the semantic delta-weight map, and a guided filter. Performing the tone fusion operation further includes generating the fused image based on the filtered weight maps and decomposed versions of the LDR images.

In a second embodiment, an electronic device includes at least one processing device configured to obtain multiple input image frames and generate an HDR blended image based on the input image frames, where the HDR blended image has a higher dynamic range than individual ones of the input image frames. The at least one processing device is also configured to perform a tone fusion operation on the HDR blended image based on a semantic delta-weight map to generate a fused image. To perform the tone fusion operation, the at least one processing device is configured to synthesize multiple LDR images based on the HDR blended image; generate initial weight maps based on the LDR images; generate filtered weight maps based on the initial weight maps, the semantic delta-weight map, and a guided filter; and generate the fused image based on the filtered weight maps and decomposed versions of the LDR images.

In a third embodiment, a non-transitory machine-readable medium contains instructions that when executed cause at least one processor of an electronic device to obtain multiple input image frames and generate an HDR blended image based on the input image frames, where the HDR blended image has a higher dynamic range than individual ones of the input image frames. The non-transitory machine-readable medium also contains instructions that when executed cause the at least one processor to perform a tone fusion operation on the HDR blended image based on a semantic delta-weight map to generate a fused image. The instructions that when executed cause the at least one processor to perform the tone fusion operation include instructions that when executed cause the at least one processor to synthesize multiple LDR images based on the HDR blended image; generate initial weight maps based on the LDR images; generate filtered weight maps based on the initial weight maps, the semantic delta-weight map, and a guided filter; and generate the fused image based on the filtered weight maps and decomposed versions of the LDR images.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
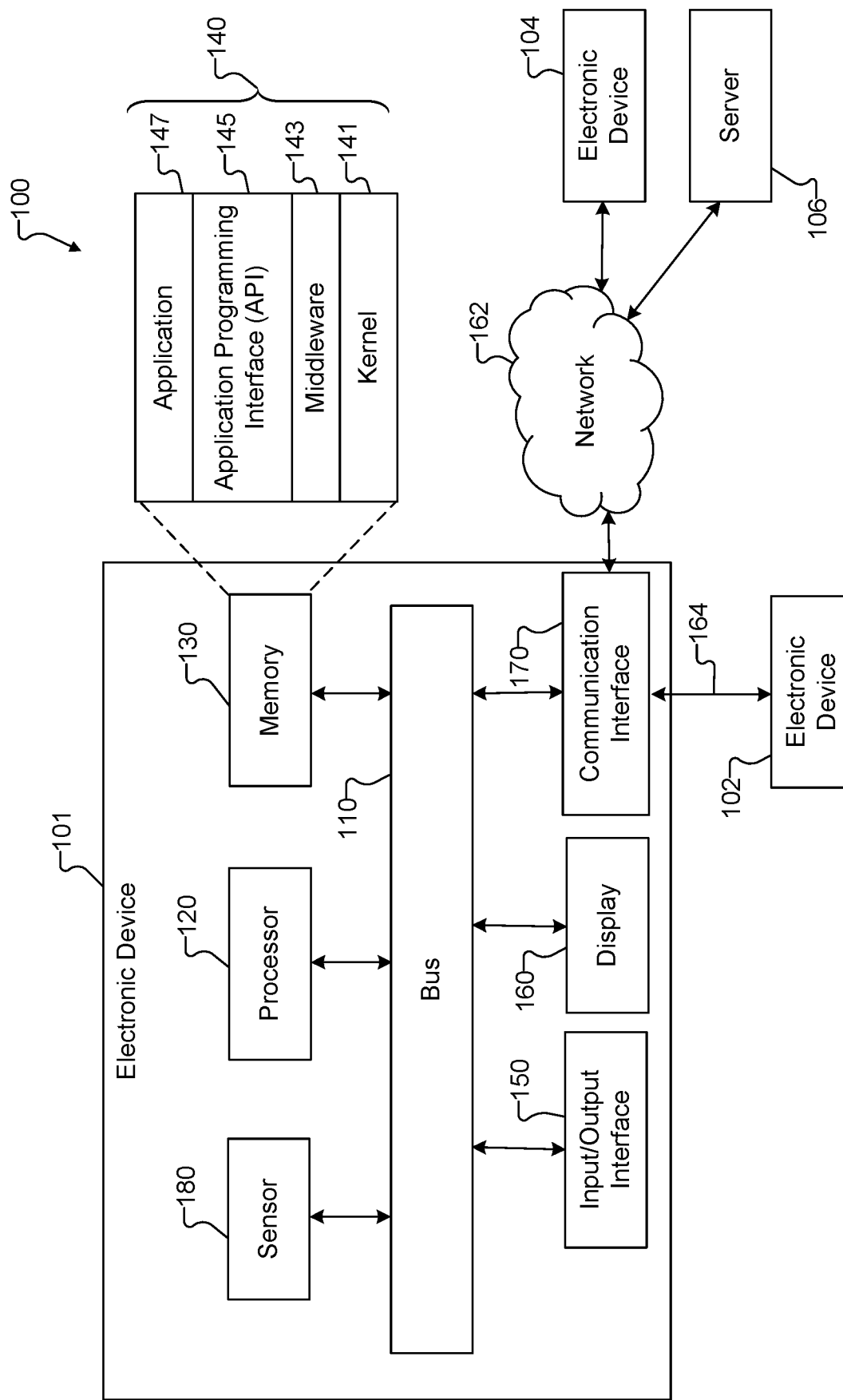
FIG. 1 illustrates an example network configuration including an electronic device according to this disclosure.

FIGS. 1 through 12, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, mobile electronic devices, such as smartphones and tablet computers, have become the most prevalent device type for capturing, uploading, and sharing digital images. "Computational photography" refers to an image generation technique commonly used in these and other types of devices in which one or more digital images of a scene are captured and processed digitally in order to produce desired effects within one or more final images of the scene. Computational photography has advanced in the past several years to significantly close the gap against traditional digital single lens reflex (DSLR) cameras. For example, computational photography techniques have been developed to effectively support functions such as zooming, low-light photography, and the use of under-display cameras.

One example image processing function often performed by mobile electronic devices is contrast enhancement, which represents a tone mapping operation that generally involves adjusting the contrast within images to improve image features while attempting to keep dark areas dark and bright areas bright. Among other things, this can help to reduce haziness or other issues in captured images. Contrast enhancement often takes one of two forms, namely global contrast enhancement and local contrast enhancement. Global contrast enhancement typically involves performing tone mapping over an entire image, while local contrast enhancement typically involves performing tone mapping within localized regions of an image. Unfortunately, global contrast enhancement can often darken important areas within images, such as a person's face. Also, local contrast enhancement often does not respect object boundaries and can create brighter or darker spots within objects, such as when brighter halos or darker blobs or other shapes appear within the sky or other areas of images. In both cases, these issues can create undesirable artifacts in images, which decreases the quality of the images and thereby decreases user satisfaction.

This disclosure provides various techniques related to machine learning segmentation-based tone mapping in high noise and high dynamic range environments or other environments. As described in more detail below, multiple input image frames can be obtained, such as multiple image frames of a scene obtained by a mobile electronic device or other electronic device. A high dynamic range (HDR) blended image can be generated based on the input image frames, and the HDR blended image can have a higher dynamic range than individual ones of the input image frames. A tone fusion operation can be performed on the HDR blended image based on a semantic delta-weight map to generate a fused image. Performing the tone fusion operation can include synthesizing multiple low dynamic range (LDR) images based on the HDR blended image and generating initial weight maps based on the LDR images. Performing the tone fusion operation can also include generating filtered weight maps based on the initial weight maps, the semantic delta-weight map, and a guided filter. Performing the tone fusion operation can further include generating the fused image based on the filtered weight maps and decomposed versions of the LDR images.

In some cases, the fused image can be generated by performing an image decomposition of each of the LDR images to generate base and detail components of each of the LDR images, performing a base blending operation based on the filtered weight maps and the base components of the LDR images, performing a detail blending operation based on the filtered weight maps and the detail components of the LDR images, and combining results of the base and detail blending operations to generate the fused image. Also, in some cases, the semantic delta-weight map can be obtained by generating a lower-resolution HDR blended image based on the HDR blended image, generating a lower-resolution LDR blended image based on the lower-resolution HDR blended image, generating a lower-resolution LDR blended YUV image based on the lower-resolution LDR blended image, generating a semantic segmentation mask based on the lower-resolution LDR blended YUV image, and generating the semantic delta-weight map based on the semantic segmentation mask using a mapping.

In this way, the disclosed techniques support the use of semantic-based tone mapping, which can be performed using a tone fusion operation that is guided based on a semantic or segmentation map or mask associated with content within the input image frames. For example, the tone fusion operation may obtain the HDR blended image and the semantic delta-weight map (which can be generated using a trained machine learning model), where the HDR blended image is processed using the semantic delta-weight map to perform tone fusion. These techniques allow for more effective tone mapping operations to be performed, such as during contrast enhancement operations. Moreover, these techniques can reduce or avoid the darkening of important areas within images, respect object boundaries while performing tone mapping, and reduce or avoid the creation of undesired brighter or darker spots within objects. Overall, these techniques can be used to produce images of scenes having higher quality, which can increase user satisfaction.

Note that while some of the embodiments discussed below are described in the context of use in consumer electronic devices (such as smartphones), this is merely one example. It will be understood that the principles of this disclosure may be implemented in any number of other suitable contexts and may use any suitable device or devices. Also note that while some of the embodiments discussed below are described based on the assumption that one device (such as a server) performs training of a machine learning model that is deployed to one or more other devices (such as one or more consumer electronic devices), this is also merely one example. It will be understood that the principles of this disclosure may be implemented using any number of devices, including a single device that both trains and uses a machine learning model. In general, this disclosure is not limited to use with any specific type(s) of device(s).

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to machine learning segmentation-based tone mapping in high noise and high dynamic range environments or other environments.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to machine learning segmentation-based tone mapping. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform various operations related to machine learning segmentation-based tone mapping in high noise and high dynamic range environments or other environments.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
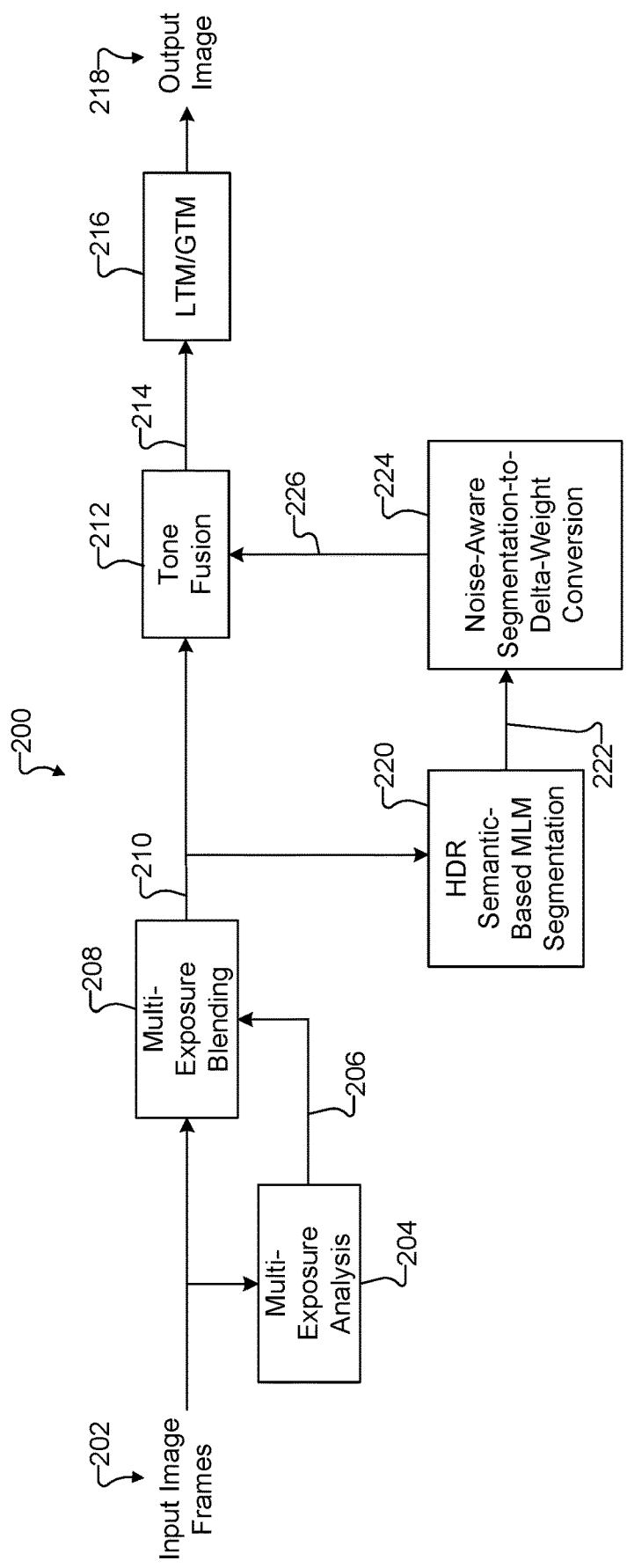
FIG. 2 illustrates an example architecture supporting machine learning segmentation-based tone mapping according to this disclosure.

FIG. 2 illustrates an example architecture 200 supporting machine learning segmentation-based tone mapping according to this disclosure. For ease of explanation, the architecture 200 shown in FIG. 2 is described as being used by the electronic device 101 in the network configuration 100 shown in FIG. 1. However, the architecture 200 could be used by any other suitable device(s) (such as the server 106) and in any other suitable system(s).

As shown in FIG. 2, the architecture 200 generally receives and processes multiple input image frames 202. Each input image frame 202 represents an image frame captured of a scene. The input image frames 202 may be obtained from any suitable source(s), such as when the input image frames 202 are generated using at least one camera or other imaging sensor 180 of the electronic device 101 during an image capture operation. Depending on the implementation, the input image frames 202 could be captured simultaneously using different cameras or other imaging sensors 180 of the electronic device 101 or captured sequentially (such as in rapid succession) using one or more cameras or other imaging sensors 180 of the electronic device 101. In some cases, the input image frames 202 can be captured in response to a capture event, such as when the processor 120 detects a user initiating image capture by depressing a hard or soft button of the electronic device 101. The input image frames 202 may have any suitable resolution(s), and the resolution of each input image frame 202 can depend on the capabilities of the imaging sensor(s) 180 in the electronic device 101 and possibly on one or more user settings affecting the resolution. In some embodiments, the input image frames 202 may represent raw image frames, RGB image frames, or image frames in any other suitable image data space. Also, in some embodiments, each input image frame 202 may include twelve-bit image data values, although data values of other bit lengths may be used.

The input image frames 202 can include image frames captured using different exposure levels, such as when the input image frames 202 include one or more shorter-exposure image frames and one or more longer-exposure image frames. As a particular example, the input image frames 202 may include one or more image frames captured at an EV–0 exposure level (also typically known as an "auto" exposure level), one or more image frames captured at an EV–2 exposure level, and one or more image frames captured at an EV–4 exposure level. Note, however, that these exposure levels are for illustration only and that input image frames 202 may be captured at any other or additional exposure levels, such as EV–1, EV–3, EV–5, EV–6, or EV+1 exposure levels.

Figure 3:
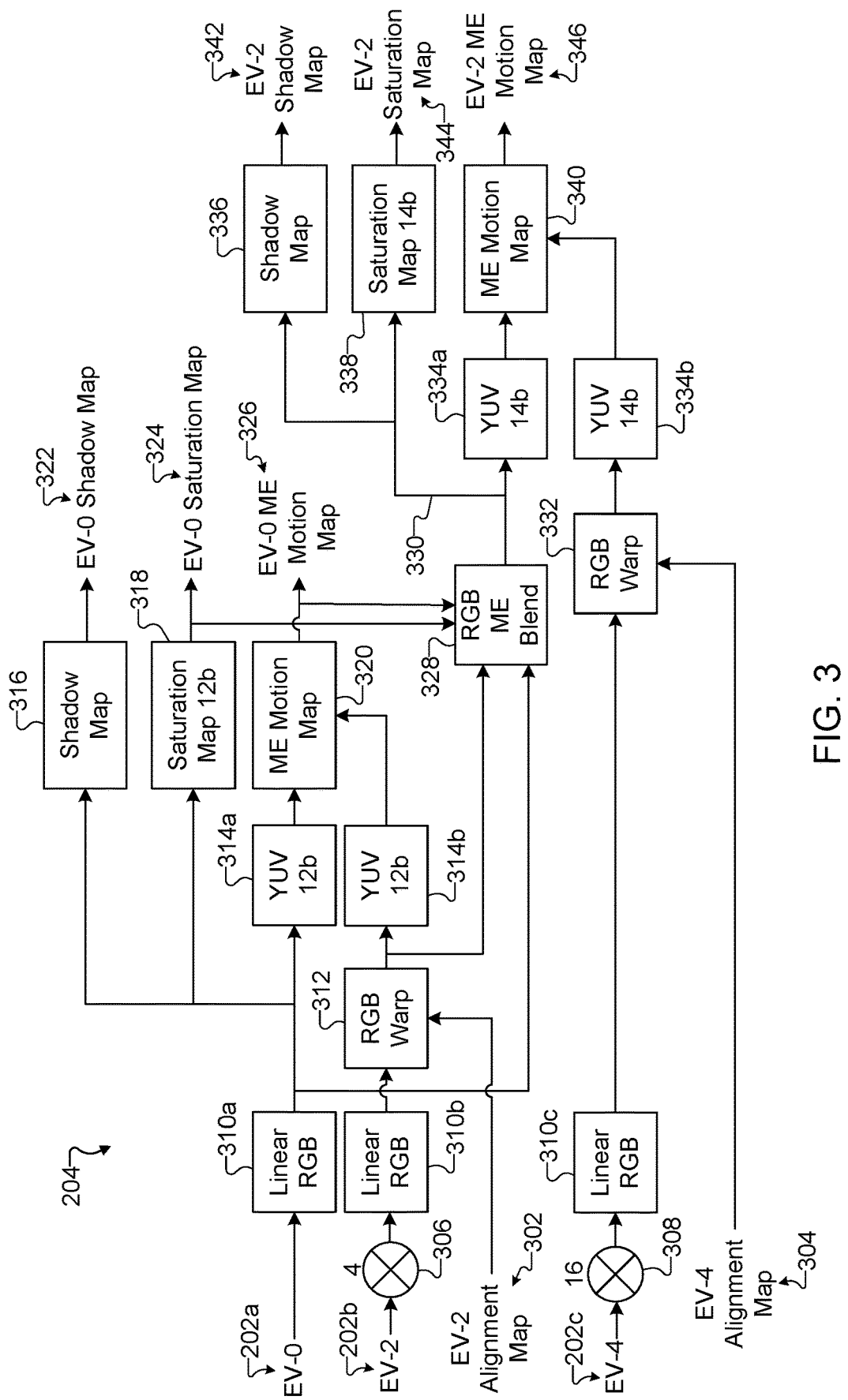
FIG. 3 illustrates an example multi-exposure analysis operation in the architecture of FIG. 2 according to this disclosure.

In this example, the input image frames 202 are provided to a multi-exposure (ME) analysis operation 204, which processes the input image frames 202 in order to generate various outputs 206. The outputs 206 include information that can be used to support blending of the input image frames 202. For example, the ME analysis operation 204 can process the input image frames 202 in order to generate shadow maps, saturation maps, and ME motion maps for at least some of the input image frames 202. Shadow maps generally represent maps or other collections of indicators identifying where shadows are presented in the input image frames 202. Saturation maps generally represent maps or other collections of indicators identifying saturation levels within the input image frames 202, such as by identifying areas where the input image frames 202 are over-saturated or under-saturated. ME motion maps generally represent maps or other collections of indicators identifying where motion is detected between different ones of the input image frames 202. The ME analysis operation 204 may use any suitable technique(s) for generating shadow maps, saturation maps, and ME motion maps. One example implementation of the ME analysis operation 204 is shown in FIG. 3, which is described below.

Figure 4:
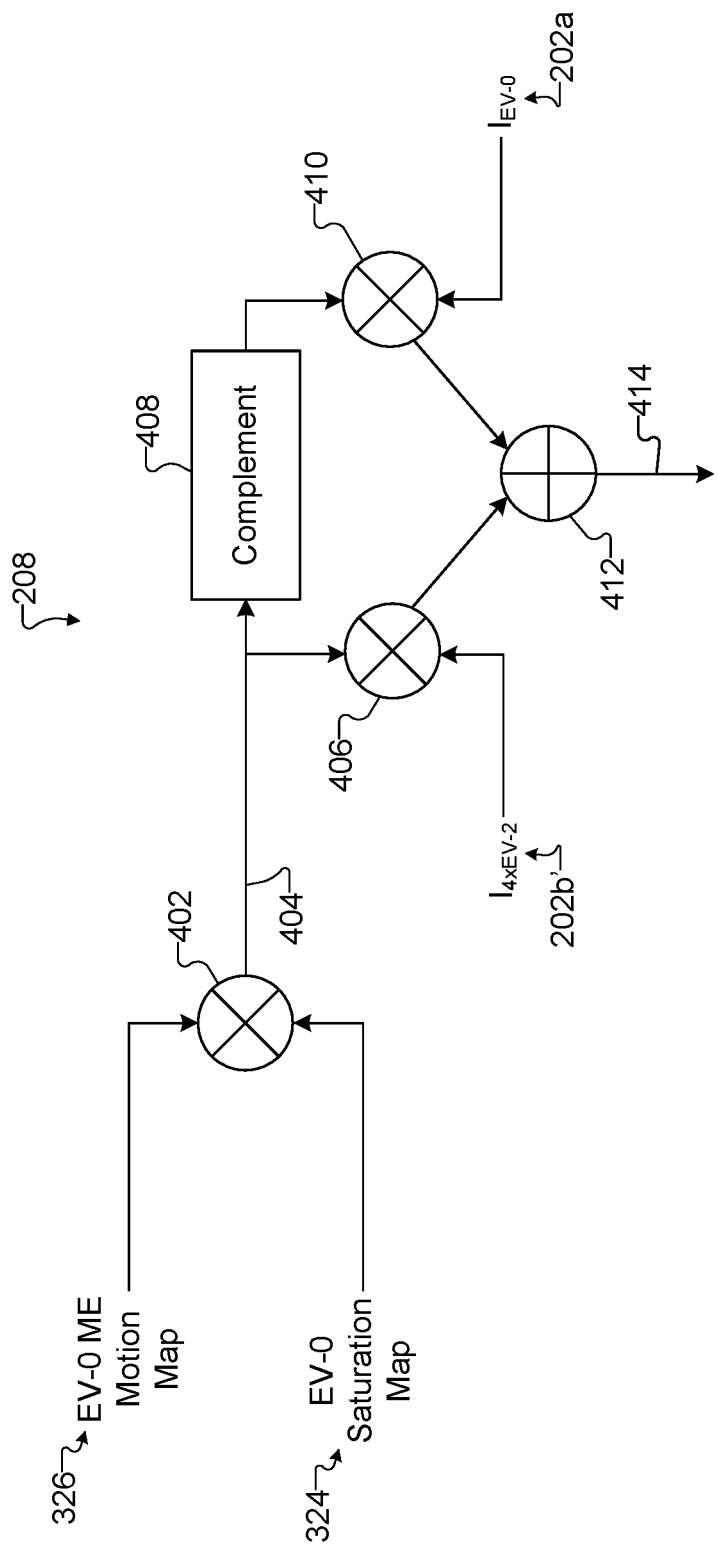
FIG. 4 illustrates an example multi-exposure blending operation in the architecture of FIG. 2 according to this disclosure.

The input image frames 202 and the outputs 206 from the ME analysis operation 204 are provided to an ME blending operation 208, which represents a multi-frame blending operation that combines the input image frames 202 based on the outputs 206 in order to generate a high dynamic range (HDR) blended image 210. The HDR blended image 210 is referred to as a "high dynamic range" image since it generally has a higher dynamic range than any single one of the individual input image frames 202. The ME blending operation 208 may use any suitable technique(s) for blending the input image frames 202. For example, in some embodiments, the ME blending operation 208 can independently blend red (R), green (G), and blue (B) channels of image data (and possibly one or more additional channels of image data) contained in the input image frames 202. The blending of the image data can be controlled based on the outputs 206 of the ME analysis operation 204, such as when the ME blending operation 208 blends to recover areas of the input image frames 202 that are over-saturated or under-saturated and not associated with motion. For areas of the input image frames 202 that are not over-saturated or under-saturated or that are associated with motion, the ME blending operation 208 may use image data from one of the input image frames 202 (often a "reference" image frame) without blending or with very little blending. One example implementation of the ME blending operation 208 is shown in FIG. 4, which is described below.

Figure 5:
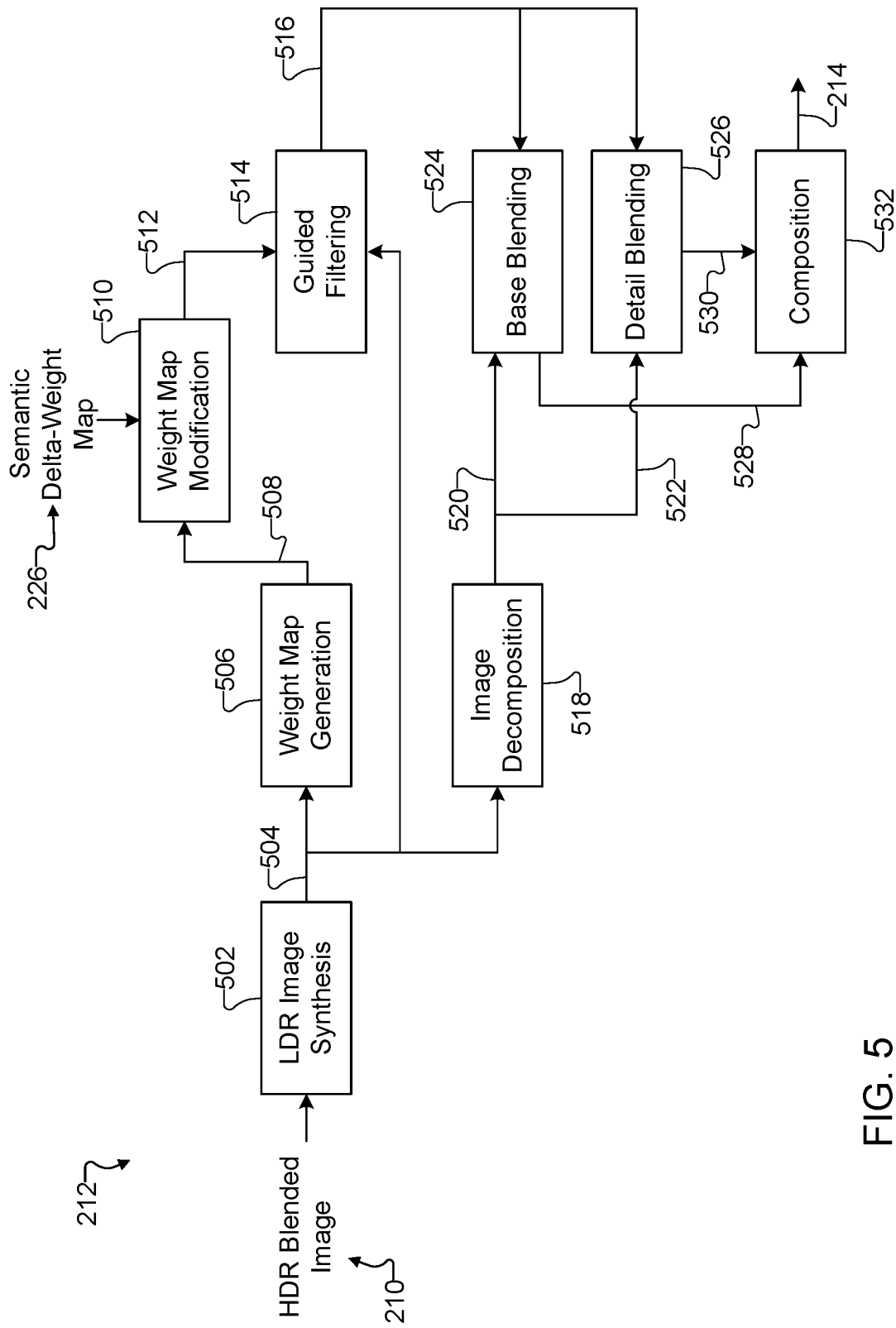
FIG. 5 illustrates an example tone fusion operation in the architecture of FIG. 2 according to this disclosure.

The HDR blended image 210 is provided to a tone fusion operation 212, which processes the HDR blended image 210 in order to modify the dynamic range within the HDR blended image 210 and generate a fused image 214. This can be done so that the fused image 214 can be displayed or otherwise presented in a form having a smaller dynamic range. This may be done, for instance, when an HDR image is to be presented on a display device having a smaller dynamic range than the HDR image itself. For example, the tone fusion operation 212 may generate multiple low dynamic range (LDR) images from the HDR blended image 210 and decompose the LDR images. The tone fusion operation 212 may also generate, modify, and filter initial weight maps in order to generate filtered weight maps. The filtered weight maps can be used during weighted blending to fuse the decomposed versions of the LDR images in order to produce the fused image 214. Ideally, these functions allow the tone fusion operation 212 to weight image data differently in order to achieve desired tone modifications to the HDR blended image 210 and generate the fused image 214. One example implementation of the tone fusion operation 212 is shown in FIG. 5, which is described below.

The fused image 214 here may be subjected to a tone mapping operation 216, which may include local tone mapping (LTM) and/or global tone mapping (GTM). The tone mapping operation 216 may typically be used as a post-processing operation to fine-tune tone. In some cases, this can be done so that the fused image 214 can have higher or lower contrast and/or color saturation or so that the fused image 214 can be brighter or darker. The tone mapping operation 216 may use any suitable technique(s) to perform tone mapping. The result of the tone mapping operation 216 is an output image 218, which can be stored, output, or used in any suitable manner as needed or desired.

Figure 9:
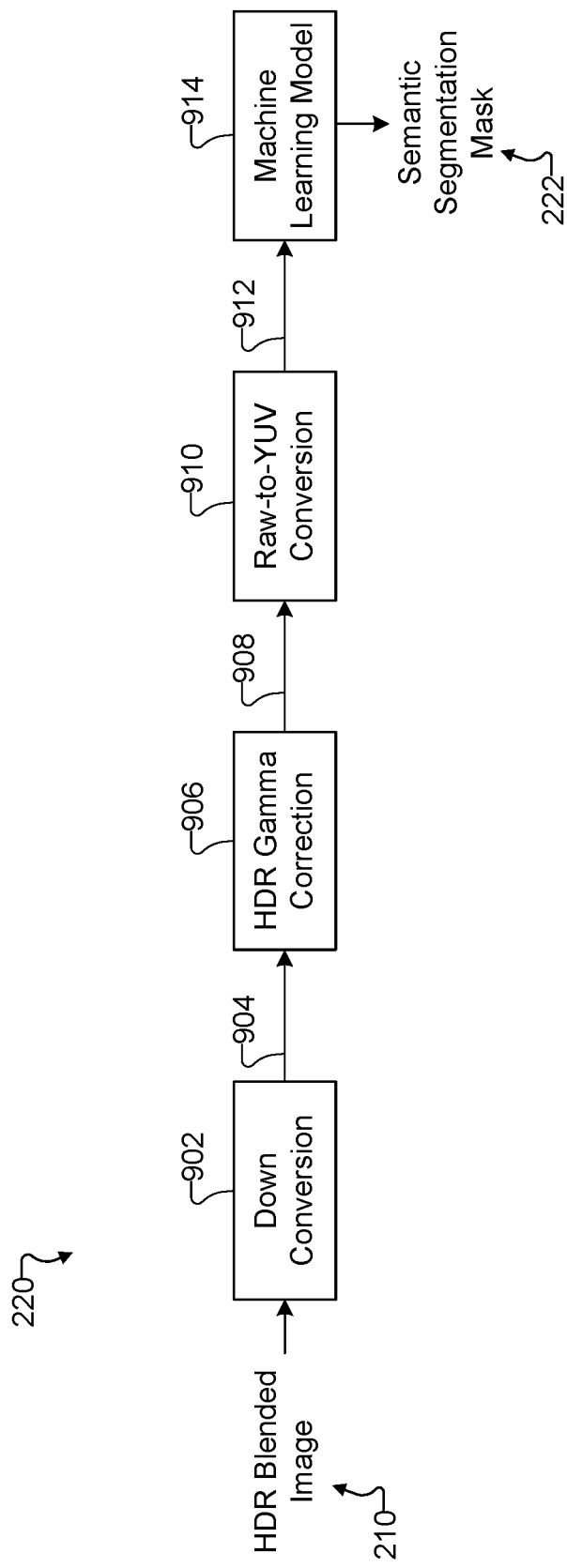
FIG. 9 illustrates an example semantic-based machine learning model segmentation operation in the architecture of FIG. 2 according to this disclosure.

The HDR blended image 210 is also provided to an HDR semantic-based machine learning model (MLM) segmentation operation 220, which processes the HDR blended image 210 in order to generate a semantic segmentation mask 222 associated with the HDR blended image 210. The semantic segmentation mask 222 represents a map or other collection of indicators that identify one or more objects within the HDR blended image 210 and which pixels of the HDR blended image 210 are associated with each object. For example, the semantic segmentation mask 222 may identify pixels of the HDR blended image 210 that are associated with people, animals, trees or other plants, buildings/walls/floors/windows/other manmade structures, the ground, grass, water, the sky, or the background within the HDR blended image 210. In some embodiments, the HDR semantic-based MLM segmentation operation 220 can include a machine learning model, such as a convolutional neural network (CNN) or other neural network, that has been trained to perform image segmentation. One example implementation of the HDR semantic-based MLM segmentation operation 220 is shown in FIG. 9, which is described below.

Figure 11:
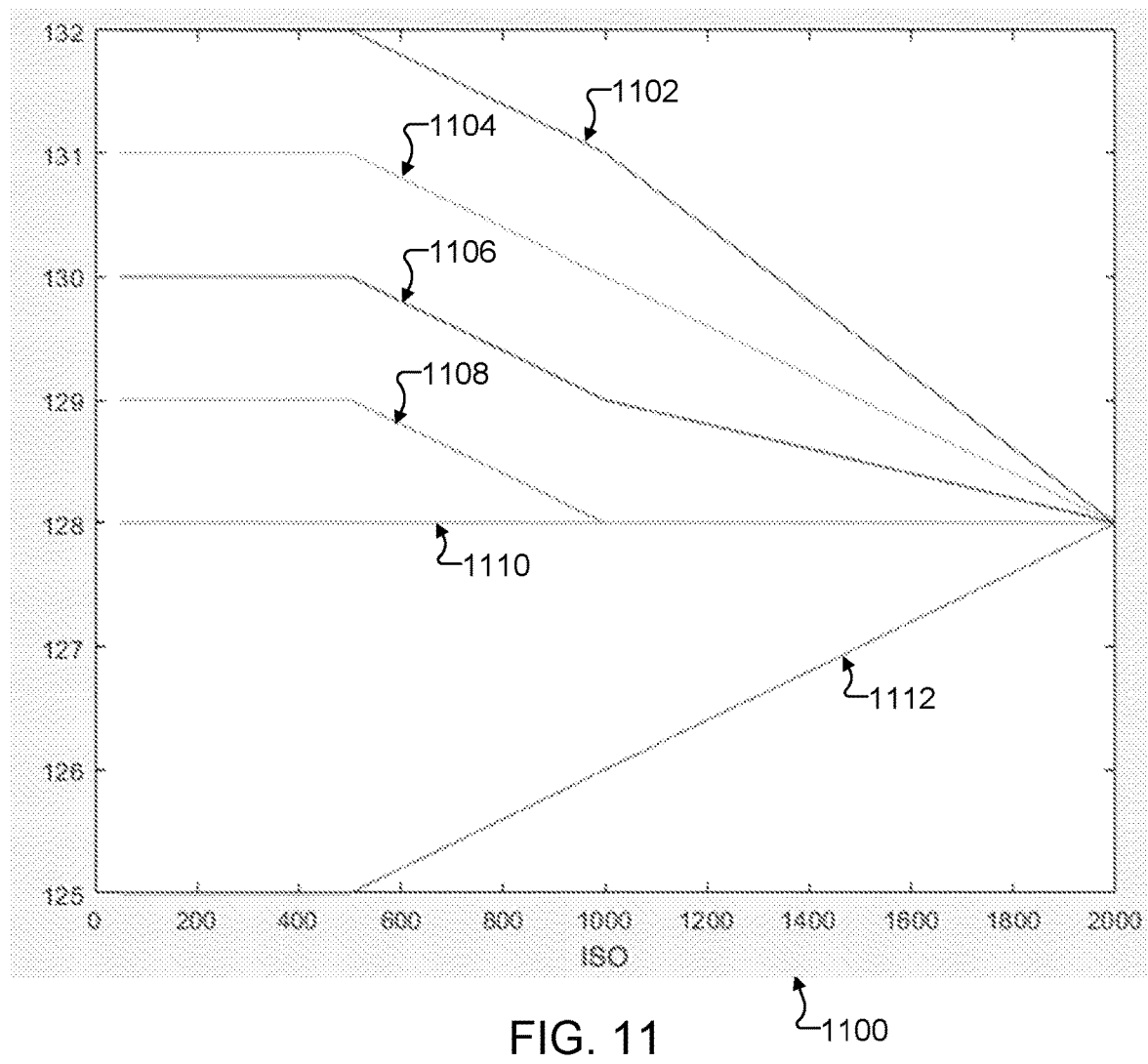
FIG. 11 illustrates an example mapping for use by the noise-aware segmentation-to-delta-weight conversion operation in the architecture of FIG. 2 according to this disclosure.

The semantic segmentation mask 222 is provided to a noise-aware segmentation-to-delta-weight conversion operation 224, which processes the semantic segmentation mask 222 in order to generate a semantic delta-weight map 226. The semantic delta-weight map 226 identifies how the initial weight maps generated by the tone fusion operation 212 can be modified in order to support appropriate object segmentation when performing tone fusion to generate the fused image 214. For example, the segmentation-to-delta-weight conversion operation 224 may use a mapping to translate segmentation mask values from the semantic segmentation mask 222 into corresponding delta-weight map values in the semantic delta-weight map 226. The tone fusion operation 212 can modify the initial weight maps based on the delta-weight map values in the semantic delta-weight map 226. As described below, in some cases, the mapping used by the segmentation-to-delta-weight conversion operation 224 can be based on metadata (such as ISO, exposure time, and/or brightness) associated with the HDR blended image 210 or image data contained in the HDR blended image 210. This may allow the segmentation-to-delta-weight conversion operation 224 to be "noise-aware" since factors like ISO, exposure time, and brightness can have an impact on the amount of noise contained in the HDR blended image 210. The noise-aware segmentation-to-delta-weight conversion operation 224 may use any suitable technique(s) to perform segmentation to delta-weight conversion. Details of one example approach used by the noise-aware segmentation-to-delta-weight conversion operation 224 are shown in FIG. 11, which is described below.

As can be seen here, the architecture 200 supports the performance of semantic-based tone mapping. This is accomplished using the tone fusion operation 212, which operates based on the semantic delta-weight map 226. Since the semantic delta-weight map 226 is generated using the segmentation of the HDR blended image 210, the semantic delta-weight map 226 can be used to guide the fusion of image data by the tone fusion operation 212, which allows tone fusion to be guided based on the semantic content of the HDR blended image 210 as defined by the semantic segmentation mask 222. Moreover, the HDR semantic-based MLM segmentation operation 220 and the noise-aware segmentation-to-delta-weight conversion operation 224 can help to provide robust and reliable handling of semantic map inaccuracies, such as inaccuracies that routinely occur in the presence of high noise and with HDR scenes. Among other things, this can be accomplished by processing the HDR blended image 210, rather than an individual input image frame 202.

Although FIG. 2 illustrates one example of an architecture 200 supporting machine learning segmentation-based tone mapping, various changes may be made to FIG. 2. For example, various components or functions shown in FIG. 2 may be combined, further subdivided, rearranged, replicated, or omitted and additional components can be added according to particular needs.

FIG. 3 illustrates an example multi-exposure (ME) analysis operation 204 in the architecture 200 of FIG. 2 according to this disclosure. As shown in FIG. 3, the ME analysis operation 204 receives input image frames 202a-202c and alignment maps 302, 304 as inputs. The input image frames 202a-202c can represent input image frames 202 that were captured using different exposure levels. In this particular example, one or more input image frames 202a may represent one or more EV-0 image frames, one or more input image frames 202b may represent one or more EV-2 image frames, and one or more input image frames 202c may represent one or more EV-4 image frames. As noted above, however, input image frames 202 having other or additional exposure levels may be used.

Each alignment map 302, 304 represents alignment differences between two of the input image frames 202a-202c. For instance, the alignment map 302 may represent alignment differences between the input image frames 202a and 202b, so the alignment map 302 can be referred to as an EV-2 alignment map. Similarly, the alignment map 304 may represent alignment differences between the input image frames 202a and 202c, so the alignment map 302 can be referred to as an EV-4 alignment map. Here, the input image frame 202a may be treated as a reference frame, and an alignment map can be generated or otherwise obtained for each of the other input image frames 202b-202c (which are referred to as non-reference image frames). Note that while the alignment maps 302, 304 are shown here as being input to the ME analysis operation 204, the ME analysis operation 204 may itself determine the alignment maps 302, 304 based on the input image frames 202a-202c.

The electronic device 101 performs multiplication operations 306 and 308 on the input image frame 202b and the input image frame 202c, respectively, in order to substantially equalize the brightness levels among the input image frames 202a-202c. For example, the multiplication operations 306 and 308 can be pixel-by-pixel multiplication operations, where each pixel of the input image frames 202b-202c is multiplied by a multiplication value. In this particular example, pixel values in the input image frame 202b are multiplied by four in the multiplication operation 306, and pixel values in the input image frame 202c are multiplied by sixteen in the multiplication operation 308. The multiplication values of four and sixteen are based on the use of the EV-2 and EV-4 exposure levels, so different multiplication values may be used if different exposure levels are used.

The electronic device 101 also performs linear red-green-blue (RGB) conversion operations 310a-310c on the input image frame 202a and the equalized versions of the input image frames 202b-202c. In some embodiments, the input image frames 202a-202c may be received in a Bayer or other raw image domain, and the electronic device 101 performs the linear RGB conversion operations 310a-310c to convert the input image frames 202a-202c (or equalized versions thereof) into the RGB domain. For example, in some cases, each of the linear RGB conversion operations 310a-310c may perform the following operations.

$$R = R_B \quad (1)$$

$$G = \frac{(G_{B1} + G_{B2})}{2} \quad (2)$$

$$B = B_B \quad (3)$$

Here, R, G, and B respectively represent the red, green, and blue values of each pixel in the RGB domain, and $R_B$, $G_{B1}$, $G_{B2}$, and BB respectively represent the red, first green, second green, and blue values of each pixel in the Bayer or other raw domain. Of course, these operations are examples only, and other suitable conversion operations could be used. Note that while three instances of the linear RGB conversion operations 310a-310c are shown in FIG. 3 (which may operate in parallel), one or two linear RGB conversion operations may be used and may process different image data sequentially.

The electronic device 101 performs an RGB warp operation 312 on the equalized version of the input image frame 202b as converted into the RGB domain. For example, the RGB warp operation 312 can warp the equalized converted version of the input image frame 202b using the alignment map 302 in order to align the equalized converted version of the input image frame 202b with the converted version of the input image frame 202a. The electronic device 101 can use any suitable technique(s) to warp image data during the RGB warp operation 312. In some embodiments, for instance, the electronic device 101 performs a bilinear image warp independently for each of the red, green, and blue channels.

The electronic device 101 performs a luma-chroma (YUV) conversion operation 314a on the converted input image frame 202a and a YUV conversion operation 314b on the equalized, converted, and warped input image frame 202b. Using the YUV conversion operations 314a-314b, the electronic device 101 converts these versions of the input image frames 202a and 202b from the RGB domain to the YUV domain. In some embodiments, each of the YUV conversion operations 314a-314b may be a twelve-bit operation (such as a twelve-bit depth per pixel), although this is not required. In some cases, each of the YUV conversion operations 314a-314b may perform the following operations.

$$R_g = \text{gamma}(R, b) \quad (4)$$

$$G_g = \text{gamma}(G, b) \quad (5)$$

$$B_g = \text{gamma}(B, b) \quad (6)$$

$$Y = 0.2126 * R_g + 0.7152 * G_g + 0.0722 * B_g \quad (7)$$

$$U = -0.09991 * R_g - 0.33609 * G_g + 0.436 * B_g \quad (8)$$

$$V = 0.615 * R_g - 0.55861 * G_g - 0.05639 * B_g \quad (9)$$

Here, R, G, and B respectively represent the red, green, and blue values of each pixel in the RGB domain; b represents the number of bits of depth for each pixel (such as twelve); $R_g$, $G_g$, and $B_g$ respectively represent intermediate values obtained after a gamma operation; and Y, U, and V respectively represent the Y (luma), U (blue chroma), and V (red chroma) values of each pixel in the YUV domain. Of course, these operations are examples only, and other suitable conversion operations could be used. Note that while two instances of the YUV conversion operations 314a-314b are shown in FIG. 3 (which may operate in parallel), one YUV conversion operation may be used and may process different image data sequentially.

Once the input image frames 202a-202b have been processed using the operations described above, the electronic device 101 performs a shadow map operation 316 to generate an EV-0 shadow map 322, performs a saturation map operation 318 to generate an EV-0 saturation map 324, and performs an ME motion map operation 320 to generate an EV-0 ME motion map 326. For example, during the shadow map operation 316, the electronic device 101 may create a base map $M_D$ from the converted input image frame 202a, such as by using the following operation.

$$M_D = \max\left(0, \min\left(1, 1 - \frac{\max(R, G, B) - 1}{3}\right)\right) \quad (10)$$

Here, R, G, and B respectively represent the red, green, and blue values of each pixel in the RGB domain. The electronic device 101 can filter the base map $M_D$, such as by using a filter $H_{3\times3}$, to generate the final EV-0 shadow map 322 $\overline{M_D}$. In some cases, this can be expressed as follows.

$$\overline{M_D} = H_{3\times3} * M_D \quad (11)$$

During the saturation map operation 318, the electronic device 101 may create a base map $M_S$ from the converted input image frame 202a, such as by using the following operation.

$$M_S = \max\left(0, \min\left(1, \frac{\max(R, G, B) - 0.9 \times 2^{12}}{0.05 \times 2^{12}}\right)\right) \quad (12)$$

The electronic device 101 can also filter the base map $M_S$, such as by using a filter $H_{3\times3}$, to generate the final EV-0 saturation map 324 $\overline{M_S}$. In some cases, this can be expressed as follows.

$$\overline{M_S} = H_{3\times3} * M_S \quad (13)$$

During the ME motion map operation 320, the electronic device 101 may determine the motion represented between the input image frames 202a-202b as processed and converted in the YUV domain. In some embodiments, the ME motion map operation 320 is a pixel-wise operation that results in the generation of the EV-0 ME motion map 326. The ME motion map operation 320 may use any suitable technique(s) for generating a motion map.

The electronic device 101 performs an RGB ME blending operation 328 using the converted versions of the input image frames 202a-202b in the RGB domain and outputs from the saturation map operation 318 and the ME motion map operation 320 to generate a blended image 330. The RGB ME blending operation 328 is a multi-exposure blending operation, which may be performed independently for each of the red, green, and blue channels. In other words, the RGB ME blending operation 328 can blend the red image data in the converted versions of the input image frames 202a-202b, blend the green image data in the converted versions of the input image frames 202a-202b, and blend the blue image data in the converted versions of the input image frames 202a-202b. The RGB ME blending operation 328 here can operate to combine the image data in each color channel for the converted versions of the input image frames 202a-202b based on the EV-0 saturation map 324 and the EV-0 motion map 326. This results in the generation of the blended image 330, which represents a combination of the image data from the input image frames 202a-202b as converted into the RGB domain.

The electronic device 101 performs an RGB warp operation 332 on the equalized version of the input image frame 202c as converted into the RGB domain. For example, similar to the RGB warp operation 312, the RGB warp operation 332 can warp the equalized converted version of the input image frame 202c using the alignment map 304 in order to align the equalized converted version of the input image frame 202c with the converted version of the input image frame 202a. The electronic device 101 can use any suitable technique(s) to warp image data during the RGB warp operation 332. In some embodiments, for instance, the electronic device 101 performs a bilinear image warp independently for each of the red, green, and blue channels. Note that the RGB warp operation 332 may represent the same functional component as the RGB warp operation 312 but applied to different image data, or the RGB warp operation 332 may be implemented independently.

The electronic device 101 performs YUV conversion operations 334a-334b on the blended image 330 and the warped version of the converted input image frame 202c, respectively. For example, using the YUV conversion operations 334a-334b, the electronic device 101 can convert the blended image 330 and the warped version of the converted input image frame 202c from the RGB domain to the YUV domain. The YUV conversion operations 334a-334b may be the same as or similar to the YUV conversion operations 314a-314b described above. In some cases, however, the YUV conversion operations 334a-334b may represent fourteen-bit operations instead of twelve-bit operations. Note that while two instances of the YUV conversion operations 334a-334b are shown in FIG. 3 (which may operate in parallel), one YUV conversion operation may be used and may process different image data sequentially.

The electronic device 101 performs a shadow map operation 336 to generate an EV−2 shadow map 342, performs a saturation map operation 338 to generate an EV−2 saturation map 344, and performs an ME motion map operation 340 to generate an EV−2 ME motion map 346. These operations 336, 338, 340 may be the same as or similar to the corresponding operations 316, 318, 320 discussed earlier, except the inputs and outputs are based on the EV−2 and EV−4 input image frames 202b-202c instead of the EV−0 and EV−2 input image frames 202a-202b. Note that the operations 336, 338, 340 may represent the same functional components as the operations 316, 318, 320 but applied to different image data, or the operations 336, 338, 340 may be implemented independently.

Additional details regarding specific example implementations of the ME analysis operation 204 shown in FIG. 3 may be found in U.S. patent application Ser. No. 18/149,714 filed on Jan. 4, 2023 (which is hereby incorporated by reference in its entirety). Note that while FIG. 3 assumes the input image frames 202a-202c are converted into the RGB domain and then into the YUV domain, other embodiments of the ME analysis operation 204 may be used. For instance, the input image frames 202a-202c may be converted directly into the YUV domain, and U.S. patent application Ser. No. 18/149,714 provides additional details of how the ME analysis operation 204 may be implemented in that manner. Moreover, any other or additional technique(s) may be used to generate shadow maps, saturation maps, ME motion maps, or other outputs 206. In general, this disclosure is not limited to any specific technique(s) for generating shadow maps, saturation maps, ME motion maps, or other outputs 206 used for blending purposes, and the outputs 206 may be generated using image data in any suitable domain(s).

Although FIG. 3 illustrates one example of an ME analysis operation 204 in the architecture 200 of FIG. 2, various changes may be made to FIG. 3. For example, various components or functions shown in FIG. 3 may be combined, further subdivided, rearranged, replicated, or omitted and additional components can be added according to particular needs. As particular examples, as noted above, various components in FIG. 3 may be used to perform the same or similar function(s), and these components may be shared across different image data or implemented independently for different image data. Also, while FIG. 3 assumes that the EV−0 image frame 202a is selected as the reference frame, this is not necessarily required. Another image frame 202b or 202c may be selected as the reference frame, in which case the positions of at least some of the image frames 202a-202c can be swapped in FIG. 3 and suitable multiplication or other scaling operations may be used to substantially equalize the image frames 202a-202c.

FIG. 4 illustrates an example multi-exposure (ME) blending operation 208 in the architecture 200 of FIG. 2 according to this disclosure. Among other things, the ME blending operation 208 can be used to recover saturations from each color channel of various input image frames 202a-202c. As shown in FIG. 4, the EV−0 saturation map 324 and the EV−0 ME motion map 326 are combined using a multiplication operation 402, which generates a combined map 404. The combined map 404 can represent the collective contents of the saturation map 324 and the motion map 326. For instance, the combined map 404 may represent the pixels of an image frame to be included during mixing based on the contents of the saturation map 324 and the motion map 326.

Using a multiplication operation 406, the combined map 404 is combined with an equalized version of the input image frame 202b, which is identified as an input image frame 202b' and denoted $I_{4 \times EV-2}$ (since it can be equalized with the input image frame 202a). The combined map 404 is also provided to a complement operation 408, which performs a uniform inversion operation (such as 1−x) on the combined map 404. Here, the combined map 404 represents weights to be applied to the input image frame 202b' during blending, while its complement represents weights to be applied to the input image frame 202a during blending. The input image frame 202a (denoted $I_{EV-0}$) is combined with the output of the complement operation 408 using a multiplication operation 410. The resulting products generated and output by the multiplication operations 406 and 410 are combined using a summation operation 412, which results in the generation of a blended image frame 414. The blended image frame 414 represents a weighted combination of pixels from the input image frames 202a and 202b'.

Note that these operations combine the input image frame 202a and the input image frame 202b'. In some cases, it may be possible to combine the input image frame 202a with multiple input image frames 202b', in which case the same or similar process shown in FIG. 4 may be repeated or expanded to use at least one additional equalized input image frame 202b' and its associated maps 324, 326. It is also possible to use the same or similar process shown in FIG. 4 to combine the input image frame 202a or the blended image frame 414 with at least one equalized version of at least one input image frame 202c (which may be denoted $I_{16 \times EV-4}$), such as when the process shown in FIG. 4 is repeated while replacing the EV−0 input image frame 202a in FIG. 4 with the blended image frame 414, replacing the equalized version of the EV−2 input image frame 202b' in FIG. 4 with an equalized version of an EV−4 input image frame 202c, and replacing the maps 324, 326 with the maps 344, 346. In addition, note that the same or similar process shown in FIG. 4 may be used to implement the RGB ME blending operation 328 shown in FIG. 3, in which case the RGB ME blending operation 328 may use the maps 324, 326 to combine the image data from the equalized and processed versions of the input image frames 202a-202b.

Again, additional details regarding specific example implementations of the ME blending operation 208 shown in FIG. 4 may be found in U.S. patent application Ser. No. 18/149,714, which has been incorporated by reference. Moreover, any other or additional technique(s) may be used to blend image frames in the ME blending operation 208 and/or the RGB ME blending operation 328, and each of these blending operations may be implemented in any other suitable manner. In general, this disclosure is not limited to any specific technique(s) for blending image frames.

Although FIG. 4 illustrates one example of an ME blending operation 208 in the architecture 200 of FIG. 2, various changes may be made to FIG. 4. For example, various components or functions shown in FIG. 4 may be combined, further subdivided, rearranged, replicated, or omitted and additional components can be added according to particular needs. As particular examples, various components in FIG. 4 may be used to perform the same or similar function(s), and these components may be shared across different image data or implemented independently for different image data. Also, while FIG. 4 assumes that the EV–0 image frame 202a is selected as the reference frame, this is not necessarily required, and another image frame 202b or 202c may be selected as the reference frame (in which case the positions of certain image frames can be swapped).

Figure 6:
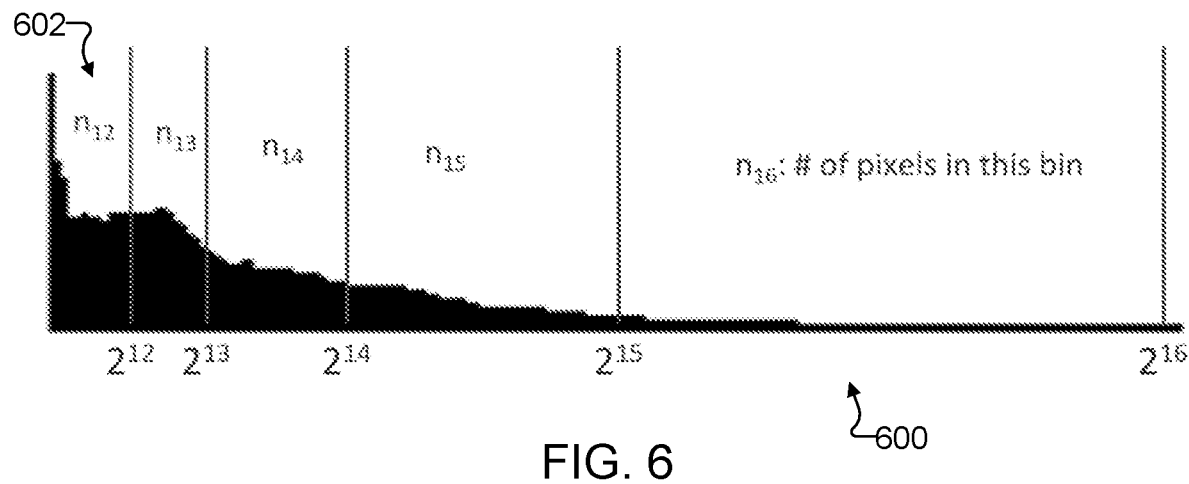
FIG. 6 illustrates an example image histogram for use by the tone fusion operation of FIG. 5 according to this disclosure.

FIG. 5 illustrates an example tone fusion operation 212 in the architecture 200 of FIG. 2 according to this disclosure. As shown in FIG. 5, the tone fusion operation 212 receives the HDR blended image 210, which is provided to an LDR image synthesis operation 502. The LDR image synthesis operation 502 uses the HDR blended image 210 to generate multiple LDR images 504, each of which can represent the image data from the HDR blended image 210 but have a lower dynamic range that the HDR blended image 210. The LDR image synthesis operation 502 may use any suitable technique(s) for generating LDR images 504 based on an HDR blended image 210. Details of one example approach used by the LDR image synthesis operation 502 are shown in FIG. 6, which is described below. In some cases, each of the LDR images 504 can represent a YUV image.

Figure 7:
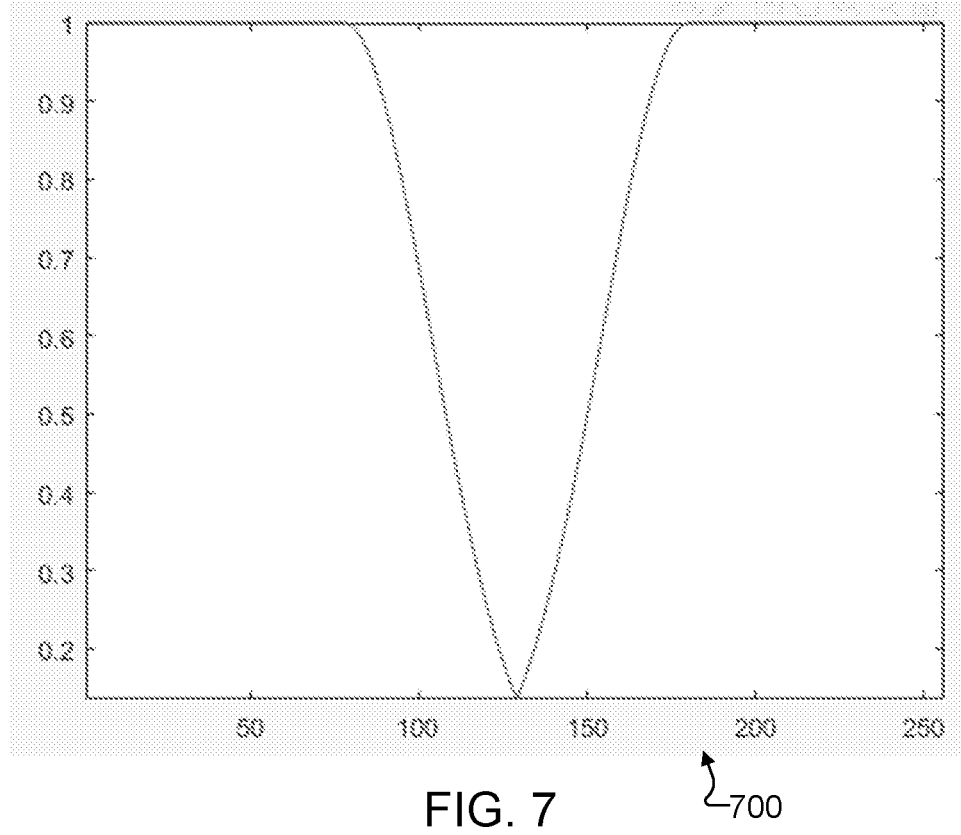
FIGS. 7 and 8 illustrate example lookup tables for use by the tone fusion operation of FIG. 5 according to this disclosure.
Figure 8:
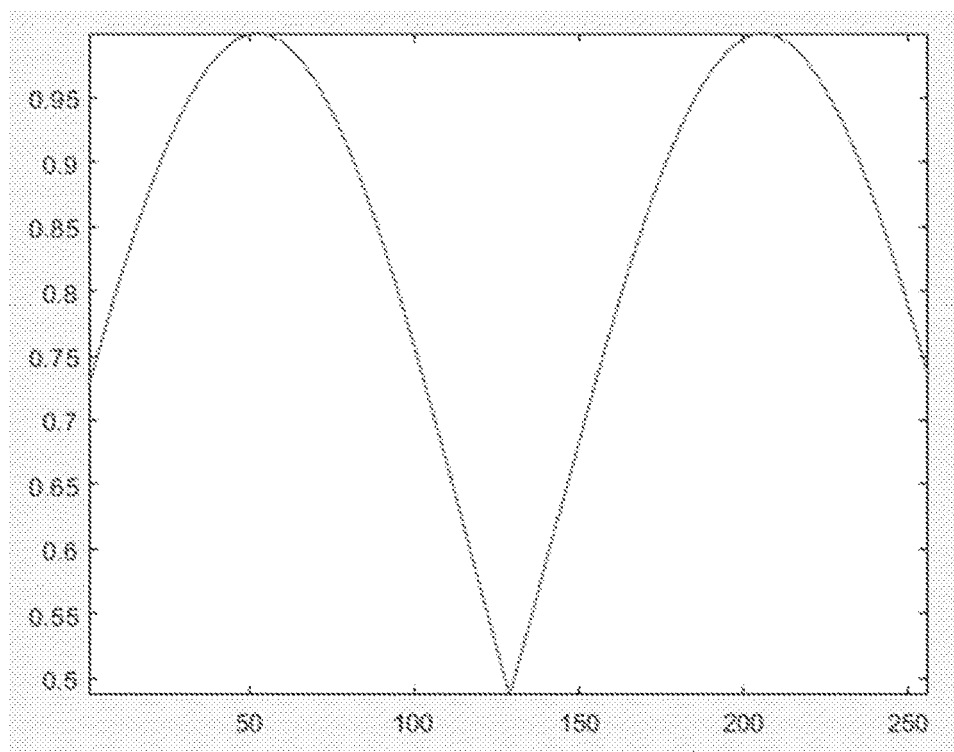

The LDR images 504 are provided to a weight map generation operation 506, which processes the LDR images 504 in order to generate initial weight maps 508 associated with the LDR images 504. The initial weight maps 508 represent initial maps or other collections of indicators identifying how image data from the LDR images 504 may be combined to produce a fused image 214. For example, each initial weight map 508 may include weights to be applied to the image data from one of the LDR images 504 during blending. The weight map generation operation 506 may use any suitable technique(s) for generating initial weight maps 508 for LDR images 504. For instance, the weight map generation operation 506 may generate saliency metrics, color saturation metrics, and well-exposedness metrics for each LDR image 504. The saliency, color saturation, and well-exposedness metrics can be combined for each of the LDR images 504, and the combined metrics can be normalized to generate the initial weight map 508 for each of the LDR images 504. Details of one example approach used by the weight map generation operation 506 are shown in FIGS. 7 and 8, which are described below.

The initial weight maps 508 are provided to a weight map modification operation 510, which modifies one or more of the initial weight maps 508 based on the semantic delta-weight map 226 to generate modified weight maps 512. As noted above, the semantic delta-weight map 226 is based on semantic content of the HDR blended image 210, and the semantic delta-weight map 226 can be used to modify one or more of the initial weight maps 508 in order to adjust the initial weight map(s) 508 based on the semantic content of the HDR blended image 210. As a particular example, the weight map modification operation 510 can scale, increase, or decrease values in one or more of the initial weight maps 508 based on values in the semantic delta-weight map 226, such as by adding or subtracting values based on the semantic delta-weight map 226 to or from the values in the initial weight map(s) 508. The weight map modification operation 510 may use any suitable technique(s) for modifying initial weight maps 508 and generate modified weight maps 512.

The modified weight maps 512 are provided to a guided filtering operation 514, which processes the modified weight maps 512 in order to generate filtered weight maps 516. The guided filtering operation 514 can filter the modified weight maps 512 in order to provide any desired effects in the filtered weight maps 516. As particular examples, the guided filtering operation 514 may process the modified weight maps 512 in order to remove noise from the modified weight maps 512 while preserving edges in the modified weight maps 512. The guided filtering operation 514 may use any suitable technique(s) for filtering weight maps. In some embodiments, for instance, the guided filtering operation 514 may filter weight maps using the approaches described in He et al., "Guided image filtering," IEEE Transactions on Pattern Analysis and Machine Intelligence, Vol. 35, Issue 6, June 2013, pp. 1397-1409 (which is hereby incorporated by reference in its entirety).

The LDR images 504 here are also provided to a decomposition operation 518, which decomposes each of the LDR images 504 into a base layer 520 containing base components of the LDR image 504 and a detail layer 522 containing detail components of the LDR image 504. The base layer 520 for each LDR image 504 may include large-scale variations in intensity of that LDR image 504, and the detail layer 522 for each LDR image 504 may capture fine-scale details of that LDR image 504. The decomposition operation 518 may use any suitable technique(s) for decomposing LDR images 504 into base and detail layers 520, 522. In some cases, for instance, the decomposition operation 518 may use box filtering. As a particular example, using the luma channel (Y) as an example, let $Y_i$, i=1, ..., N represent the luma channel of each LDR image 504. The base layer $YB_i$ of each LDR image 504 may be defined as follows.

$$YB_i = boxfilt(Y_i, \theta) \tag{14}$$

Here, θ represents the size of the box filter. The detail layer $YD_i$ of each LDR image 504 may be obtained by subtracting the associated base layer 520 from the corresponding LDR image 504, which may be defined as follows.

$$YD_i = Y_i - YB_i \tag{15}$$

The decompositions for the chroma (U and V) channels may occur in a similar manner, except a specified value (such as 0.5 if the chroma values range between 0 and 1 or 128 if the chroma values range between 0 and 255) can be subtracted from the chroma values first. Note that the selection of the value for θ can be important here. If the value of θ is too large, each detail layer 522 may include more low-frequency information, and unnatural transition boundaries can be produced in the resulting images. If the value of θ is too small, details cannot be well-preserved.

A base blending operation 524 is used to blend the base layers 520 of the LDR images 504, and a detail blending operation 526 is used to blend the detail layers 522 of the LDR images 504. The blending operations 524 and 526 here use the filtered weight maps 516 in order to respectively blend the base layers 520 and the detail layers 522 of the LDR images 504. For example, each filtered weight map 516 can identify the weights to be applied to one of the LDR images 504, and each of the blending operations 524 and 526 can perform a weighted combination of the image data in the base layers 520 or the image data in the detail layers 522 (where the values in each base layer 520 or detail layer 522 are scaled or otherwise weighted using the values in the associated filtered weight map 516). Thus, the base blending operation 524 can be used to generate a combined base layer 528, which represents a weighted combination of the base layers 520 of the LDR images 504. Similarly, the detail blending operation 526 can be used to generate a combined detail layer 530, which represents a weighted combination of the detail layers 522 of the LDR images 504. Each of the blending operations 524 and 526 may use any suitable technique(s) for performing weighted blending of LDR images 504.

The combined base layer 528 and the combined detail layer 530 are provided to a composition operation 532, which combines the combined base layer 528 and the combined detail layer 530 in order to generate the fused image 214. The composition operation 532 can use any suitable technique(s) to combine base and detail image data in order to generate a fused image 214. In some cases, for instance, the composition operation 532 may add the values of the combined base layer 528 and the values of the combined detail layer 530 to generate the fused image 214.

As described above, the LDR image synthesis operation 502 can generate the LDR images 504 based on the HDR blended image 210. In some embodiments, the LDR image synthesis operation 502 may generate the LDR images 504 by calculating fusion scales based on a histogram of the image data contained in the HDR blended image 210 and generating the LDR images 504 using the HDR blended image 210 and the fusion scales. FIG. 6 illustrates an example image histogram 600 for use by the tone fusion operation 212 of FIG. 5 according to this disclosure. As can be seen in FIG. 6, the image histogram 600 identifies the number of pixels from the HDR blended image 210 within each of multiple bins 602, where each bin 602 is associated with a different range of pixel values. In some cases, the image histogram 600 may be generated based on the brightness associated with each pixel of the HDR blended image 210. In this particular example, the image histogram 600 is shown as being generated in the log 2 domain, and the bins 602 can be associated with unequal numbers of pixel values. However, any other suitable image histogram 600 may be generated and used here.

Based on the image histogram 600, multiple fusion scales may be generated based on the number of pixels in at least some of the bins 602 of the image histogram 600. In some embodiments, for instance, five fusion scales may be determined as follows.

$$\log_2 s_0 = ((b_0 - 15) * n_{15} + (b_0 - 16) * n_{16})/(n_{15} + n_{16}) \quad (16)$$

$$\log_2 s_1 = ((b_1 - 13) * n_{13} + (b_1 - 14) * n_{14})/(n_{13} + n_{14}) \quad (17)$$

-continued
$$\log_2 s_2 = ((b_2 - 11) * n_{11} + (b_2 - 12) * n_{12})/(n_{11} + n_{12}) \quad (18)$$

$$\log_2 s_3 = ((b_3 - 9) * n_9 + (b_3 - 10) * n_{10})/(n_9 + n_{10}) \quad (19)$$

$$\log_2 s_4 = ((b_4 - 7) * n_7 + (b_4 - 8) * n_8)/(n_7 + n_8) \quad (20)$$

In Equations (16)-(20), $s_0$-$s_4$ represent the fusion scales, n, represents the number of pixels in the $i^{th}$ bin 602, and b, represents a $j^{th}$ tunable parameter. Each of the tunable parameters can be used to adjust the weighting between two adjacent bins 602 of the image histogram 600. The LDR image synthesis operation 502 can multiply the image data of the HDR blended image 210 by each of the fusion scales $s_0$-$s_4$, clip the resulting scaled image data, and apply any desired image signal processing (ISP) conversion operations to the clipped and scaled image data. For instance, the ISP conversion operations may include demosaicing, dynamic range control (DRC), color correction using a color correction matrix (CCM), gamma correction, and RGB-to-YUV conversion. Details of example implementations of particular ISP conversion operations may be found in U.S. Pat. No. 11,388,348 (which is hereby incorporated by reference in its entirety). The results of the ISP conversion operations represent the LDR images 504. Note that in this particular example, the LDR image synthesis operation 502 can generate five LDR images 504 based on five fusion scales, although other numbers of fusion scales and LDR images 504 may be generated.

As described above, the weight map generation operation 506 processes the LDR images 504 in order to generate the initial weight maps 508 associated with the LDR images 504. In some embodiments, the weight map generation operation 506 may generate the initial weight maps 508 by calculating saliency, color saturation, and well-exposedness metrics for each LDR image 504, combining the metrics for each LDR image 504, and normalizing the combined metrics to generate the initial weight map 508 for each of the LDR images 504. In some embodiments, the saliency, color saturation, and well-exposedness metrics for each LDR image 504 may be determined as follows. In order to generate saliency metrics for each LDR image 504, the weight map generation operation 506 may perform Laplacian filtering of the LDR image 504, take the absolute values of the filtering outputs generated by the Laplacian filtering, and apply Gaussian filtering to the absolute values. In some cases, this can generate a saliency metric for each pixel of each LDR image 504.

In order to generate color saturation metrics for each LDR image 504, the weight map generation operation 506 may apply a color saturation lookup table to the image chroma data (U and V channels) of the LDR image 504 and sum the values from the color saturation lookup table. In order to generate well-exposedness metrics for each LDR image 504, the weight map generation operation 506 may apply a well-exposedness lookup table to the image data of the LDR image 504. In some cases, this can generate a color saturation metric and a well-exposedness metric for each pixel of each LDR image 504. Each lookup table can be used to translate a pixel value from an LDR image 504 into a corresponding value that is used to generate a color saturation metric or a well-exposedness metric.

FIGS. 7 and 8 illustrate example lookup tables 700 and 800 for use by the tone fusion operation 212 of FIG. 5 according to this disclosure. More specifically, the lookup table 700 represents one example implementation of the color saturation lookup table, where the lookup table 700 is used to translate image chroma data of each LDR image 504 plotted along the horizontal axis into corresponding values plotted along the vertical axis. The corresponding values for each pixel in the U and V image data of each LDR image 504 can be summed and used as the color saturation metric for that pixel in the LDR image 504. The lookup table 800 represents one example implementation of the well-exposedness lookup table, where the lookup table 800 is used to translate image data of each LDR image 504 plotted along the horizontal axis into corresponding values plotted along the vertical axis. The corresponding value for each pixel in the image data of each LDR image 504 can be used as the well-exposedness metric for that pixel in the LDR image 504.

These approaches can generate saliency, color saturation, and well-exposedness metrics for each pixel of each LDR image 504. The saliency, color saturation, and well-exposedness metrics for each pixel of each LDR image 504 can be combined and normalized in order to generate the initial weight map 508 for each LDR image 504. For example, in some embodiments, the saliency, color saturation, and well-exposedness metrics determined for each LDR image 504 may be combined as follows.

$$M_j = S_j \times C_j \times E_j, j = 0, 1, 2, 3, 4 \quad (21)$$

Here, $M_j$ represents the combined metric for each pixel of the $j^{th}$ LDR image 504, $S_j$ represents the saliency metric for each pixel of the $j^{th}$ LDR image 504, $C_j$ represents the color saturation metric for each pixel of the $j^{th}$ LDR image 504, and $E_j$ represents the well-exposedness metric for each pixel of the $j^{th}$ LDR image 504. The variable j here is assumed to have five possible values due to the generation of five LDR images 504 based on five fusion scales, although other numbers of LDR images 504 may be generated as noted above. The normalization of the combined metrics may be performed as follows.

$$P_j = M_j / \sum_j M_j \quad (22)$$

Here, $P_j$ represents the normalized combined metric for each pixel of the $j^{th}$ LDR image 504. The normalized combined metrics for all pixels of each LDR image 504 can be used to form the initial weight map 508 for that LDR image 504.

As described above, one or more of the initial weight maps 508 are modified by the weight map modification operation 510 in order to generate the modified weight maps 512, and the guided filtering operation 514 filters the modified weight maps 512 in order to generate the filtered weight maps 516. Among other things, the guided filtering operation 514 may be used to remove noise from the modified weight maps 512 while preserving edges identified in the modified weight maps 512. Tone fusion can be achieved by weighted blending of the base and detail layers 520, 522 of the LDR images 504 (which is based on the filtered weight maps 516) and combining the resulting combined base and detail layers 528, 530. In some cases, the operations used to generate a fused image 214 may be expressed as follows.

$$I_{b,d} = \sum_j I_j \times P_j, j = 0, 1, 2, 3, 4 \quad (23)$$

$$I = I_b + I_d \quad (24)$$

Here, $I_{b,d}$ represents the combined base layer 528 or the combined detail layer 530, $I_j$ represents the base layer 520 or the detail layer 522 of the $j^{th}$ LDR image 504, and I represents the fused image 214. Again, the variable j here is assumed to have five possible values due to the generation of five LDR images 504, although other numbers of LDR images 504 may be generated as noted above.

Although FIGS. 5 through 8 illustrate one example of a tone fusion operation 212 in the architecture 200 of FIG. 2 and related details, various changes may be made to FIGS. 5 through 8. For example, various components or functions shown in FIG. 5 may be combined, further subdivided, rearranged, replicated, or omitted and additional components can be added according to particular needs. Also, the contents of the histogram 600 in FIG. 6 can vary based on the circumstances, such as based on the contents of the input image frames 202 actually being processed. In addition, the contents of the lookup tables 700, 800 in FIGS. 7 and 8 are examples only and can vary depending on the implementation.

FIG. 9 illustrates an example semantic-based machine learning model (MLM) segmentation operation 220 in the architecture 200 of FIG. 2 according to this disclosure. As shown in FIG. 9, the semantic-based MLM segmentation operation 220 receives the HDR blended image 210, which is provided to a down conversion operation 902. The down conversion operation 902 operates to take a higher-resolution image and generate a lower-resolution version of the image, which here converts the HDR blended image 210 into a lower-resolution HDR blended image 904. The down conversion operation 902 may use any suitable technique(s) to down convert or otherwise lower the resolution of an image.

Figure 10:
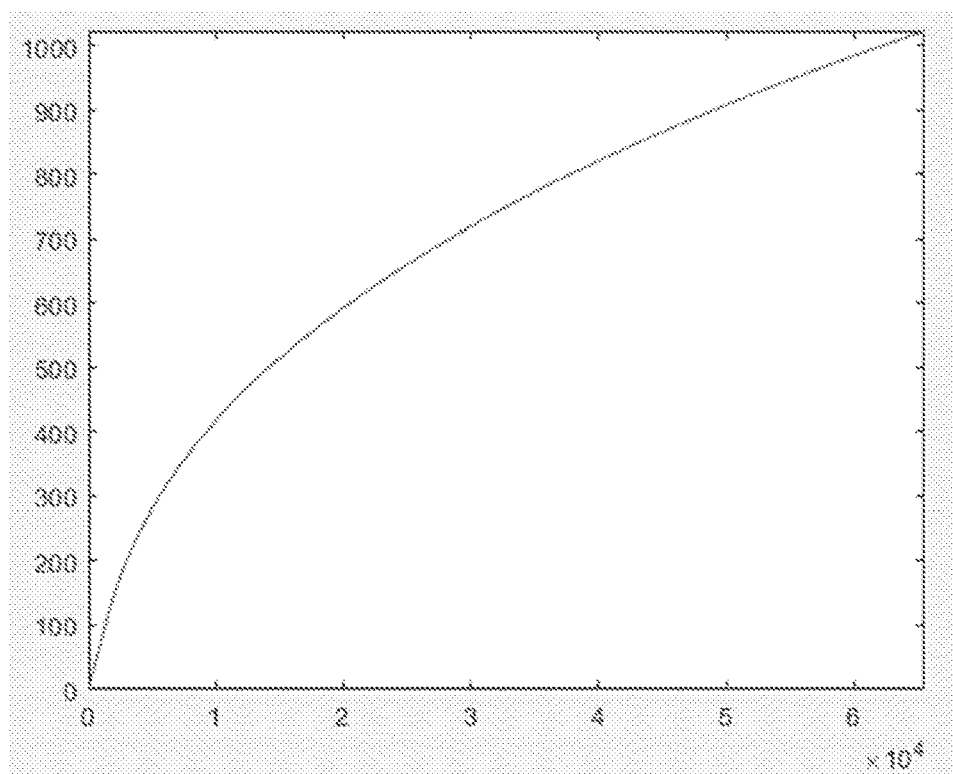
FIG. 10 illustrates an example lookup table for use by the semantic-based machine learning model segmentation operation of FIG. 9 according to this disclosure.

The lower-resolution HDR blended image 904 is provided to an HDR gamma correction operation 906, which processes the lower-resolution HDR blended image 904 in order to lower the dynamic range of the lower-resolution HDR blended image 904 and generate a lower-resolution LDR blended image 908. The HDR gamma correction operation 906 may use any suitable technique(s) for performing gamma correction and lowering the dynamic range of an image. In some embodiments, for instance, the HDR gamma correction operation 906 uses a gamma correction lookup table to perform the gamma correction. FIG. 10 illustrates an example lookup table 1000 for use by the semantic-based machine learning model segmentation operation 220 of FIG. 9 according to this disclosure. Here, the lookup table 1000 represents the gamma correction lookup table and can be used to convert values associated with the lower-resolution HDR blended image 904 plotted along the horizontal axis into corresponding values associated with the lower-resolution LDR blended image 908 plotted along the vertical axis.

The lower-resolution LDR blended image 908 is provided to a raw-to-YUV conversion operation 910, which converts the lower-resolution LDR blended image 908 from the raw image domain to the YUV image domain. Here, the HDR blended image 210 (and therefore the lower-resolution HDR blended image 904 and the lower-resolution LDR blended image 908) are assumed to be in the raw image domain, so the raw-to-YUV conversion operation 910 can be used to convert the lower-resolution LDR blended image 908 into a lower-resolution LDR blended YUV image 912. The raw-to-YUV conversion operation 910 can use any suitable technique(s) to convert raw image data into YUV image data. In some cases, for instance, the raw-to-YUV conversion operation 910 may use Equations (1)-(3) and (7)-(9) above to convert the image data of the lower-resolution LDR blended image 908 into corresponding image data of the lower-resolution LDR blended YUV image 912.

The lower-resolution LDR blended YUV image 912 is provided to a trained machine learning model 914, which processes the lower-resolution LDR blended YUV image 912 in order to generate a semantic segmentation mask 222 associated with the HDR blended image 210. The trained machine learning model 914 may represent any suitable machine learning model structure, such as a convolutional neural network (CNN) or other neural network. In some embodiments, for instance, the trained machine learning model 914 may represent a trained U-Net architecture, which is a CNN-based architecture designed to perform image segmentation. The trained machine learning model 914 can be trained to process lower-resolution LDR blended YUV images 912, identify objects within the lower-resolution LDR blended YUV images 912, and generate semantic segmentation masks 222 that identify which pixels in the lower-resolution LDR blended YUV images 912 are associated with different identified objects within the lower-resolution LDR blended YUV images 912.

In some cases, the machine learning model 914 can be trained by providing the machine learning model 914 with training images and comparing semantic segmentation masks 222 generated by the machine learning model 914 with ground truth semantic segmentation masks. The ground truth semantic segmentation masks represent desired outputs from the machine learning model 914, and comparing the semantic segmentation masks 222 actually generated by the machine learning model 914 with the ground truth semantic segmentation masks can produce a loss value identifying the accuracy of the machine learning model 914. When the loss value exceeds a threshold loss value, weights or other parameters of the machine learning model 914 can be adjusted, and another training iteration can occur. This may be repeated any number of times, ideally until the machine learning model 914 generates semantic segmentation masks 222 that are the same as or substantially similar to the ground truth semantic segmentation masks (at least to within a desired degree of accuracy defined by the threshold loss value).

Note that the input to the semantic-based MLM segmentation operation 220 here is an HDR blended image 210, which is generated based on blending multiple input image frames 202. The semantic-based MLM segmentation operation 220 does not simply receive and process a single input image frame 202, which has a lower dynamic range than the HDR blended image 210. The use of an HDR blended image 210 to generate a semantic segmentation mask 222 can help to improve the accuracy and robustness of the semantic segmentation mask 222 as compared to a semantic segmentation mask that might be generated using only one of the input image frames 202.

Although FIGS. 9 and 10 illustrate one example of a semantic-based MLM segmentation operation 220 in the architecture 200 of FIG. 2 and related details, various changes may be made to FIGS. 9 and 10. For example, various components or functions shown in FIG. 9 may be combined, further subdivided, rearranged, replicated, or omitted and additional components can be added according to particular needs. Also, the contents of the lookup table 1000 in FIG. 10 are examples only and can vary depending on the implementation.

FIG. 11 illustrates an example mapping 1100 for use by the noise-aware segmentation-to-delta-weight conversion operation 224 in the architecture 200 of FIG. 2 according to this disclosure. As described above, the noise-aware segmentation-to-delta-weight conversion operation 224 operates to convert contents of semantic segmentation masks 222 into semantic delta-weight maps 226, where the semantic delta-weight maps 226 are used to modify initial weight maps 508 (thereby allowing semantic-based guidance for the tone fusion operation 212). In some embodiments, the noise-aware segmentation-to-delta-weight conversion operation 224 can map different values from the semantic segmentation masks 222 into corresponding values in the semantic delta-weight maps 226. The different values in a semantic segmentation mask 222 represent different types or categories of semantic content in an HDR blended image 210, and the different values in a semantic delta-weight map 226 represent different modifications to be made to at least one initial weight map 508. In particular embodiments, the noise-aware segmentation-to-delta-weight conversion operation 224 can map values differently depending on metadata (such as ISO, exposure time, and brightness) associated with an HDR blended image 210 or image data contained in the HDR blended image 210.

As shown in FIG. 11, the mapping 1100 here associates ISO values plotted along the horizontal axis with delta-weight values plotted along the vertical axis. In this particular example, a delta-weight value of 128 is used to indicate that no adjustment is to be made to values in at least one initial weight map 508. Delta-weight values above 128 can be used to indicate that increases are to be made to the values in the at least one initial weight map 508, and delta-weight values below 128 can be used to indicate that decreases are to be made to the values in the at least one initial weight map 508.

In this example, the mapping 1100 varies based on which semantic category or categories of content are identified in a semantic segmentation mask 222. For example, a line 1102 can be used to represent the mapping for translating the values in the semantic segmentation mask 222 for a "background" semantic category into corresponding delta-weight values. A line 1104 can be used to represent the mapping for translating the values in the semantic segmentation mask 222 for a "sky" semantic category into corresponding delta-weight values. A line 1106 can be used to represent the mapping for translating the values in the semantic segmentation mask 222 for a "person" semantic category into corresponding delta-weight values. A line 1108 can be used to represent the mapping for translating the values in the semantic segmentation mask 222 for a "grass" semantic category into corresponding delta-weight values. A line 1110 can be used to represent the mapping for translating the values in the semantic segmentation mask 222 for a "ground" semantic category into corresponding delta-weight values. A line 1112 can be used to represent the mapping for translating the values in the semantic segmentation mask 222 for a "building" semantic category into corresponding delta-weight values.

Based on this, if the noise-aware segmentation-to-delta-weight conversion operation 224 determines that a semantic segmentation mask 222 identifies pixels associated with a background in the HDR blended image 210, the conversion operation 224 can use the ISO value associated with the HDR blended image 210 to determine a delta-weight correction value along the line 1102 to be used in the semantic delta-weight map 226, and that value can be used in the semantic delta-weight map 226 for each pixel associated with the background. If the noise-aware segmentation-to-delta-weight conversion operation 224 determines that the semantic segmentation mask 222 identifies pixels associated with a sky in the HDR blended image 210, the conversion operation 224 can use the ISO value associated with the HDR blended image 210 to determine a delta-weight correction value along the line 1104 to be used in the semantic delta-weight map 226, and that value can be used in the semantic delta-weight map 226 for each pixel associated with the sky. This can occur for each semantic category contained in the semantic segmentation mask 222, which translates values of the semantic segmentation mask 222 (each of which identifies a specific semantic category) into corresponding values in the semantic delta-weight map 226.

As described above, the weight map modification operation 510 modifies one or more of the initial weight maps 508 based on the semantic delta-weight map 226 to generate modified weight maps 512. In some embodiments and without a loss of generality (since weights are normalized for blending and changing one implies changing all), the weight map modification operation 510 can select the initial weight map 508 that is associated with the brightest LDR image 504, meaning the LDR image 504 associated with the highest fusion scale. The selected initial weight map 508 can undergo delta-weight modification, such as in the following manner.

$$M'_4 = M_4 + (\delta/256 - 0.5) \times 2 \quad (25)$$

Here, $M_4$ represents each pixel value in the selected initial weight map 508, and $M_4'$ represents each pixel value in the corresponding modified weight map 512. Also, $\delta$ represents the delta-weight value from the semantic delta-weight map 226 that is applied to each pixel value in the selected initial weight map 508. Note that if each delta-weight value from the semantic delta-weight map 226 instead can have a range from 0 to 1, the expression "$\delta/256$" in Equation (25) can be replaced with "$\delta$". Similar operations may occur for the other initial weight maps 508 in order to generate additional modified weight maps 512, or the other initial weight maps 508 may be output unchanged and used as the additional modified weight maps 512.

Although FIG. 11 illustrates one example of a mapping 1100 for use by the noise-aware segmentation-to-delta-weight conversion operation 224 in the architecture 200 of FIG. 2, various changes may be made to FIG. 11. For example, other or additional mappings may be based on factors other than or in addition to ISO value (such as exposure time and/or brightness). Also, the specific lines shown in FIG. 11 and their associated semantic categories are for illustration only. The mapping 1100 may include any number of lines, and each line may be associated with any suitable semantic category or categories.

It should be noted that the functions shown in FIGS. 2 through 11 or described above can be implemented in an electronic device 101, 102, 104, server 106, or other device(s) in any suitable manner. For example, in some embodiments, at least some of the functions shown in FIGS. 2 through 11 or described above can be implemented or supported using one or more software applications or other software instructions that are executed by the processor 120 of the electronic device 101, 102, 104, server 106, or other device(s). In other embodiments, at least some of the functions shown in FIGS. 2 through 11 or described above can be implemented or supported using dedicated hardware components. In general, the functions shown in FIGS. 2 through 11 or described above can be performed using any suitable hardware or any suitable combination of hardware and software/firmware instructions. Also, the functions shown in FIGS. 2 through 11 or described above can be performed by a single device or by multiple devices. For instance, the server 106 might be used to train the machine learning model 914, and the server 106 could deploy the trained machine learning model 914 to one or more other devices (such as the electronic device 101) for use.

Figure 12:
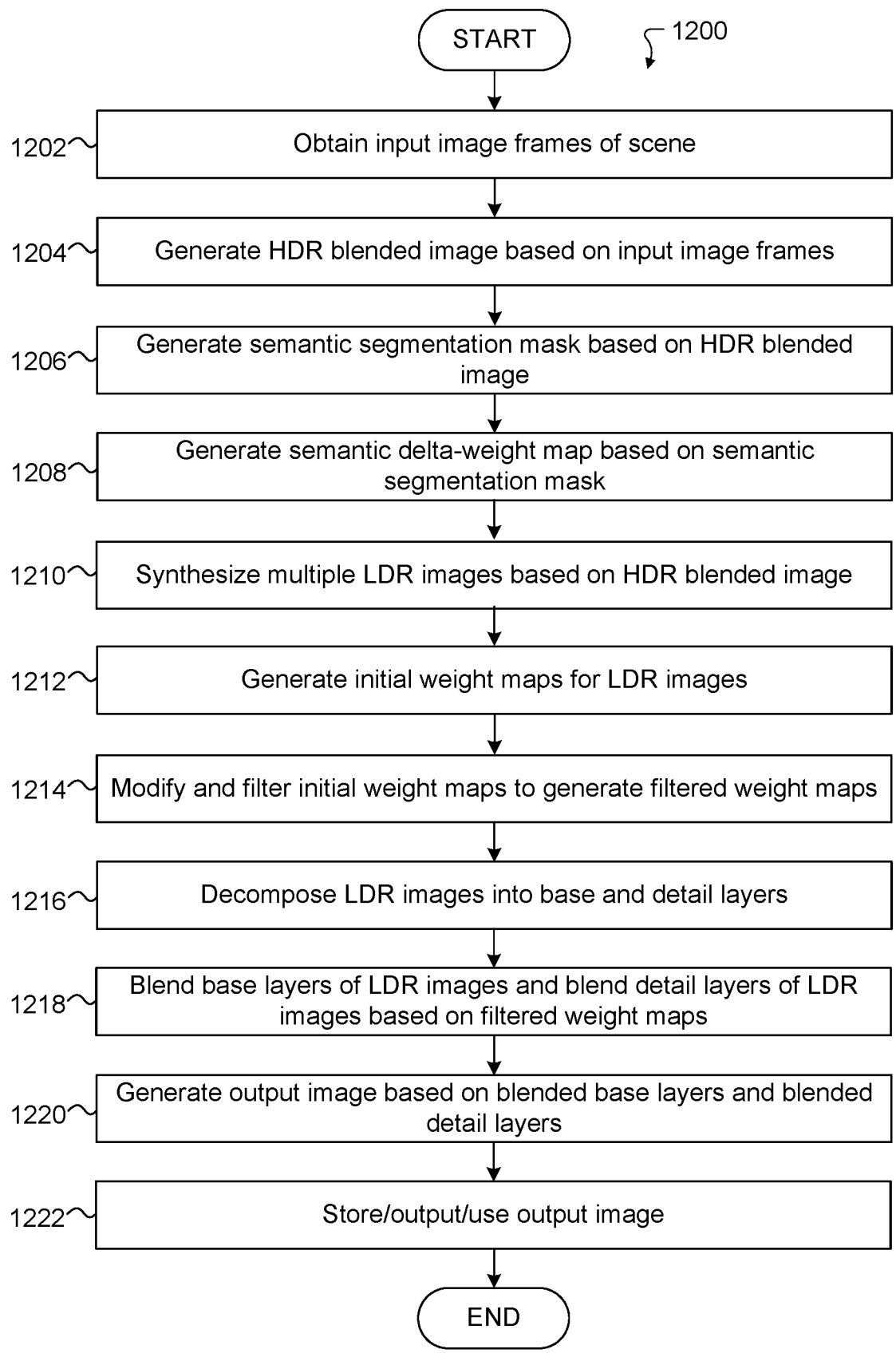
FIG. 12 illustrates an example method for machine learning segmentation-based tone mapping according to this disclosure.

FIG. 12 illustrates an example method 1200 for machine learning segmentation-based tone mapping according to this disclosure. For ease of explanation, the method 1200 is described as being performed by the electronic device 101 in the network configuration 100 shown in FIG. 1 using the architecture 200 shown in FIG. 2. However, the method 1200 may be performed using any other suitable device(s) supporting any other suitable architecture(s) and in any other suitable system(s).

As shown in FIG. 12, multiple input image frames of a scene are obtained at step 1202. This may include, for example, the processor 120 of the electronic device 101 obtaining the input image frames 202 using one or more imaging sensors 180 of the electronic device 101. An HDR blended image is generated based on the input image frames at step 1204. This may include, for example, the processor 120 of the electronic device 101 performing the ME analysis operation 204 to generate shadow maps, saturation maps, ME motion maps, or other outputs 206. This may also include the processor 120 of the electronic device 101 performing the ME blending operation 208 to blend the input image frames 202 based on the outputs 206, thereby generating an HDR blended image 210. The HDR blended image 210 can have a higher dynamic range than any individual one of the input image frames 202.

Tone fusion can be performed on the HDR blended image in order to generate a fused image. For example, a semantic segmentation mask is generated based on the HDR blended image at step 1206. This may include, for example, the processor 120 of the electronic device 101 performing the HDR semantic-based MLM segmentation operation 220 to generate a semantic segmentation mask 222 based on the contents of the HDR blended image 210. As a particular example, this may include the processor 120 of the electronic device 101 generating a lower-resolution HDR blended image 904 based on the HDR blended image 210, generating a lower-resolution LDR blended image 908 based on the lower-resolution HDR blended image 904, generating a lower-resolution LDR blended YUV image 912 based on the lower-resolution LDR blended image 908, and generating the semantic segmentation mask 222 based on the lower-resolution LDR blended YUV image 912 (possibly by using a trained machine learning model 914). A semantic delta-weight map is generated based on the semantic segmentation mask at step 1208. This may include, for example, the processor 120 of the electronic device 101 performing the noise-aware segmentation-to-delta-weight conversion operation 224 to convert the semantic segmentation mask 222 into a semantic delta-weight map 226. As a particular example, this may include the processor 120 of the electronic device 101 using a mapping 1100 to translate different values of different semantic classes in the semantic segmentation mask 222 into corresponding values in the semantic delta-weight map 226, which may be done based on metadata (such as ISO, exposure time, and/or brightness) associated with the HDR blended image 210 or image data contained in the HDR blended image 210.

Multiple LDR images are synthesized based on the HDR blended image at step 1210. This may include, for example, the processor 120 of the electronic device 101 performing the LDR image synthesis operation 502 in order to generate multiple LDR images 504 based on the HDR blended image 210. As a particular example, this may include the processor 120 of the electronic device 101 identifying an image histogram 600 of the HDR blended image 210, determining multiple fusion scales based on the image histogram 600, multiplying image data of the HDR blended image 210 by the fusion scales and clipping resulting image data to generate clipped image data, and applying ISP conversion (such as demosaicing, DRC, color correction using a CCM, gamma correction, and RGB-to-YUV conversion) to the clipped image data in order to generate YUV images.

Initial weight maps for the LDR images are generated at step 1212. This may include, for example, the processor 120 of the electronic device 101 performing the weight map generation operation 506 to process the LDR images 504 and generate the initial weight maps 508 based in image contents of the LDR images 504. As a particular example, this may include the processor 120 of the electronic device 101 generating saliency metrics, color saturation metrics, and well-exposedness metrics for the LDR images 504. The color saturation metrics and the well-exposedness metrics may be generated using first and second lookup tables 700, 800, respectively. This may also include the processor 120 of the electronic device 101 combining the saliency, color saturation, and well-exposedness metrics for each of the LDR images 504 and normalizing the combined metrics to generate the initial weight map 508 for that LDR image 504. The initial weight maps are modified and filtered to generate filtered weight maps at step 1214. This may include, for example, the processor 120 of the electronic device 101 performing the weight map modification operation 510 to modify one or more of the initial weight maps 508 based on the semantic delta-weight map 226 and generate modified weight maps 512. This may also include the processor 120 of the electronic device 101 performing the guided filtering operation 514 to filter the modified weight maps 512 using a guided filter and generate the filtered weight maps 516.

The LDR images are decomposed to base and detail layers at step 1216. This may include, for example, the processor 120 of the electronic device 101 performing the decomposition operation 518 to decompose each LDR image 504 into a base layer 520 and a detail layer 522. The base layers of the LDR images are blended with each other and the detail layers of the LDR images are blended with each other based on the filtered weight maps at step 1218. This may include, for example, the processor 120 of the electronic device 101 performing the base blending operation 524 to blend the base layers 520 of the LDR images 504 and generate a combined base layer 528. This may also include the processor 120 of the electronic device 101 performing the detail blending operation 526 to blend the detail layers 522 of the LDR images 504 and generate a combined detail layer 530. An output image is generated based on the blended base layers and the blended detail layers at step 1220. This may include, for example, the processor 120 of the electronic device 101 performing the composition operation 532, which combines the combined base layer 528 and the combined detail layer 530 to generate the fused image 214. The fused image 214 may optionally undergo a tone mapping operation 216 or other post-processing in order to generate an output image 218.

The output image may be used in any suitable manner. For example, the output image may be stored, output, or used at step 1222. This may include, for example, the processor 120 of the electronic device 101 presenting the output image 218 on the display 160 of the electronic device 101, saving the output image 218 to a camera roll stored in a memory 130 of the electronic device 101, or attaching the output image 218 to a text message, email, or other communication to be transmitted from the electronic device 101. Note, however, that the output image 218 could be used in any other or additional manner.

Although FIG. 12 illustrates one example of a method 1200 for machine learning segmentation-based tone mapping, various changes may be made to FIG. 12. For example, while shown as a series of steps, various steps in FIG. 12 may overlap, occur in parallel, occur in a different order, or occur any number of times (including zero times).

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    obtaining multiple input image frames;
    generating a high dynamic range (HDR) blended image based on the input image frames, the HDR blended image having a higher dynamic range than individual ones of the input image frames; and
    performing a tone fusion operation on the HDR blended image based on a semantic delta-weight map to generate a fused image;
    wherein performing the tone fusion operation comprises:
        synthesizing multiple low dynamic range (LDR) images based on the HDR blended image;
        generating initial weight maps based on the LDR images;
        generating filtered weight maps based on the initial weight maps, the semantic delta-weight map, and a guided filter; and
        generating the fused image based on the filtered weight maps and decomposed versions of the LDR images.

2. The method of claim 1, wherein generating the fused image based on the filtered weight maps and the decomposed versions of the LDR images comprises:
    performing an image decomposition of each of the LDR images to generate base and detail components of each of the LDR images;
    performing a base blending operation based on the filtered weight maps and the base components of the LDR images;
    performing a detail blending operation based on the filtered weight maps and the detail components of the LDR images; and
    combining results of the base and detail blending operations to generate the fused image.

3. The method of claim 1, wherein synthesizing the LDR images based on the HDR blended image comprises:
    identifying an image histogram of the HDR blended image;

determining multiple fusion scales based on the image histogram;

multiplying image data of the HDR blended image by the fusion scales and clipping resulting image data to generate clipped image data; and applying image signal processing (ISP) conversion to the clipped image data in order to generate YUV images.

4. The method of claim 3, wherein generating the initial weight maps based on the LDR images comprises:

generating saliency metrics for the YUV images;

generating color saturation metrics for the YUV images using a first lookup table;

generating well-exposedness metrics for the YUV images using a second lookup table; and combining the saliency, color saturation, and well-exposedness metrics for each of the YUV images and normalizing the combined metrics to generate the initial weight map for each of the YUV images.

5. The method of claim 1, wherein generating the filtered weight maps comprises:

generating modified weight maps based on the initial weight maps and the semantic delta-weight map; and using the guided filter to remove noise from the modified weight maps while preserving edges in the modified weight maps.

6. The method of claim 1, further comprising:

generating the semantic delta-weight map;

wherein generating the semantic delta-weight map comprises:

generating a lower-resolution HDR blended image based on the HDR blended image;

generating a lower-resolution LDR blended image based on the lower-resolution HDR blended image;

generating a lower-resolution LDR blended YUV image based on the lower-resolution LDR blended image;

generating a semantic segmentation mask based on the lower-resolution LDR blended YUV image; and generating the semantic delta-weight map based on the semantic segmentation mask using a mapping.

7. The method of claim 6, wherein:

the semantic segmentation mask is generated using a trained machine learning model that processes the lower-resolution LDR blended YUV image; and the mapping is used to translate different values of different semantic classes in the semantic segmentation mask into corresponding values in the semantic delta-weight map.

8. An electronic device comprising:

at least one processing device configured to:

obtain multiple input image frames;

generate a high dynamic range (HDR) blended image based on the input image frames, the HDR blended image having a higher dynamic range than individual ones of the input image frames; and perform a tone fusion operation on the HDR blended image based on a semantic delta-weight map to generate a fused image;

wherein, to perform the tone fusion operation, the at least one processing device is configured to:

synthesize multiple low dynamic range (LDR) images based on the HDR blended image;

generate initial weight maps based on the LDR images;

generate filtered weight maps based on the initial weight maps, the semantic delta-weight map, and a guided filter; and generate the fused image based on the filtered weight maps and decomposed versions of the LDR images.

9. The electronic device of claim 8, wherein, to generate the fused image based on the filtered weight maps and the decomposed versions of the LDR images, the at least one processing device is configured to:

perform an image decomposition of each of the LDR images to generate base and detail components of each of the LDR images;

perform a base blending operation based on the filtered weight maps and the base components of the LDR images;

perform a detail blending operation based on the filtered weight maps and the detail components of the LDR images; and combine results of the base and detail blending operations to generate the fused image.

10. The electronic device of claim 8, wherein, to synthesize the LDR images based on the HDR blended image, the at least one processing device is configured to:

identify an image histogram of the HDR blended image;

determine multiple fusion scales based on the image histogram;

multiply image data of the HDR blended image by the fusion scales and clipping resulting image data to generate clipped image data; and apply image signal processing (ISP) conversion to the clipped image data in order to generate YUV images.

11. The electronic device of claim 10, wherein, to generate the initial weight maps based on the LDR images, the at least one processing device is configured to:

generate saliency metrics for the YUV images;

generate color saturation metrics for the YUV images using a first lookup table;

generate well-exposedness metrics for the YUV images using a second lookup table; and combine the saliency, color saturation, and well-exposedness metrics for each of the YUV images and normalize the combined metrics to generate the initial weight map for each of the YUV images.

12. The electronic device of claim 8, wherein, to generate the filtered weight maps, the at least one processing device is configured to:

generate modified weight maps based on the initial weight maps and the semantic delta-weight map; and use the guided filter to remove noise from the modified weight maps while preserving edges in the modified weight maps.

13. The electronic device of claim 8, wherein:

the at least one processing device is further configured to generate the semantic delta-weight map; and to generate the semantic delta-weight map, the at least one processing device is configured to:

generate a lower-resolution HDR blended image based on the HDR blended image;

generate a lower-resolution LDR blended image based on the lower-resolution HDR blended image;

generate a lower-resolution LDR blended YUV image based on the lower-resolution LDR blended image;

generate a semantic segmentation mask based on the lower-resolution LDR blended YUV image; and generate the semantic delta-weight map based on the semantic segmentation mask using a mapping.

14. The electronic device of claim 13, wherein:

the at least one processing device is configured to generate the semantic segmentation mask using a trained machine learning model that is configured to process the lower-resolution LDR blended YUV image; and the at least one processing device is configured to use the mapping to translate different values of different semantic classes in the semantic segmentation mask into corresponding values in the semantic delta-weight map.

15. A non-transitory machine-readable medium containing instructions that when executed cause at least one processor of an electronic device to:

obtain multiple input image frames;

generate a high dynamic range (HDR) blended image based on the input image frames, the HDR blended image having a higher dynamic range than individual ones of the input image frames; and perform a tone fusion operation on the HDR blended image based on a semantic delta-weight map to generate a fused image;

wherein the instructions that when executed cause the at least one processor to perform the tone fusion operation comprise instructions that when executed cause the at least one processor to:

synthesize multiple low dynamic range (LDR) images based on the HDR blended image;

generate initial weight maps based on the LDR images;

generate filtered weight maps based on the initial weight maps, the semantic delta-weight map, and a guided filter; and generate the fused image based on the filtered weight maps and decomposed versions of the LDR images.

16. The non-transitory machine-readable medium of claim 15, wherein the instructions that when executed cause the at least one processor to generate the fused image based on the filtered weight maps and the decomposed versions of the LDR images comprise instructions that when executed cause the at least one processor to:

perform an image decomposition of each of the LDR images to generate base and detail components of each of the LDR images;

perform a base blending operation based on the filtered weight maps and the base components of the LDR images;

perform a detail blending operation based on the filtered weight maps and the detail components of the LDR images; and combine results of the base and detail blending operations to generate the fused image.

17. The non-transitory machine-readable medium of claim 15, wherein the instructions that when executed cause the at least one processor to synthesize the LDR images based on the HDR blended image comprise instructions that when executed cause the at least one processor to:

identify an image histogram of the HDR blended image;

determine multiple fusion scales based on the image histogram;

multiply image data of the HDR blended image by the fusion scales and clipping resulting image data to generate clipped image data; and apply image signal processing (ISP) conversion to the clipped image data in order to generate YUV images.

18. The non-transitory machine-readable medium of claim 17, wherein the instructions that when executed cause the at least one processor to generate the initial weight maps based on the LDR images comprise instructions that when executed cause the at least one processor to:

generate saliency metrics for the YUV images;

generate color saturation metrics for the YUV images using a first lookup table;

generate well-exposedness metrics for the YUV images using a second lookup table; and combine the saliency, color saturation, and well-exposedness metrics for each of the YUV images and normalize the combined metrics to generate the initial weight map for each of the YUV images.

19. The non-transitory machine-readable medium of claim 15, wherein:

the non-transitory machine-readable medium further contains instructions that when executed cause the at least one processor to generate the semantic delta-weight map; and the instructions that when executed cause the at least one processor to generate the semantic delta-weight map comprise instructions that when executed cause the at least one processor to:

generate a lower-resolution HDR blended image based on the HDR blended image;

generate a lower-resolution LDR blended image based on the lower-resolution HDR blended image;

generate a lower-resolution LDR blended YUV image based on the lower-resolution LDR blended image;

generate a semantic segmentation mask based on the lower-resolution LDR blended YUV image; and generate the semantic delta-weight map based on the semantic segmentation mask using a mapping.

20. The non-transitory machine-readable medium of claim 19, wherein:

the instructions when executed cause the at least one processor to generate the semantic segmentation mask using a trained machine learning model that is configured to process the lower-resolution LDR blended YUV image; and the instructions when executed cause the at least one processor to use the mapping to translate different values of different semantic classes in the semantic segmentation mask into corresponding values in the semantic delta-weight map.

* * * * *